US010221976B2

(12) United States Patent
Kujawski et al.

(10) Patent No.: US 10,221,976 B2
(45) Date of Patent: Mar. 5, 2019

(54) FLUID COUPLING WITH LOCK CONNECTION

(71) Applicant: Oetiker NY, Inc., Lancaster, NY (US)

(72) Inventors: James Anthony Kujawski, Attica, NY (US); Bradley Chester Fremont, Tonawanda, NY (US)

(73) Assignee: Oatiker NY, Inc., Lancaster, NY (US)

( * ) Notice: Subject to any disclaimer, the term of this patent is extended or adjusted under 35 U.S.C. 154(b) by 862 days.

(21) Appl. No.: 14/555,301

(22) Filed: Nov. 26, 2014

(65) Prior Publication Data

US 2015/0145240 A1 May 28, 2015

Related U.S. Application Data

(60) Provisional application No. 61/909,474, filed on Nov. 27, 2013.

(51) Int. Cl.
| | |
|---|---|
| *F16L 37/02* | (2006.01) |
| *F16L 13/14* | (2006.01) |
| *F16L 41/03* | (2006.01) |
| *F16L 13/007* | (2006.01) |
| *F16L 37/088* | (2006.01) |

(52) U.S. Cl.
CPC ............ *F16L 37/02* (2013.01); *F16L 13/007* (2013.01); *F16L 13/14* (2013.01); *F16L 41/03* (2013.01); *F16L 37/088* (2013.01); *Y10T 29/49835* (2015.01); *Y10T 29/49872* (2015.01)

(58) Field of Classification Search
CPC ......... F16L 37/02; F16L 37/088; F16L 41/03; F16L 13/007; F16L 13/14; Y10T 29/49835; Y10T 29/49872

USPC ............ 285/321, 382, 256, 259, 286.2, 329
See application file for complete search history.

(56) References Cited

U.S. PATENT DOCUMENTS

| | | | | |
|---|---|---|---|---|
| 2,776,151 | A * | 1/1957 | Harkenrider | ............ F16L 47/24 |
| 3,287,034 | A * | 11/1966 | Bragg | ................. F16L 37/0987 |
| | | | | 285/382 X |
| 3,858,914 | A * | 1/1975 | Karie | ...................... F16L 47/24 |
| | | | | 285/382 X |
| 4,722,560 | A * | 2/1988 | Guest | |
| 4,811,975 | A * | 3/1989 | Paul, Jr. | |
| 5,769,465 | A * | 6/1998 | Schultz | ................. F16L 13/141 |
| | | | | 285/382 X |
| 5,833,281 | A * | 11/1998 | Hollerbach | ........... F16L 13/142 |
| | | | | 285/382 X |

(Continued)

FOREIGN PATENT DOCUMENTS

CH 476219 7/1969

*Primary Examiner* — Greg Binda
*Assistant Examiner* — Zachary T Dragicevich
(74) *Attorney, Agent, or Firm* — Simpson & Simpson, PLLC

(57) ABSTRACT

A method and apparatus for forming a quick connector with a lock connection. The quick connector includes a quick connector body and a mating component including an external spacing recess. The component includes a step bore extending from a first end. A seal member is mounted on the step surface for sealing connection to a tubular component inserted through the quick connector body into the bore end component. Material is displaced from the component into the body or from the body into the component to mechanically lock and fluidically seal the body in the first component.

19 Claims, 20 Drawing Sheets

(56) References Cited

U.S. PATENT DOCUMENTS

| | | |
|---|---|---|
| 7,234,732 B2* | 6/2007 | Ball .................... F16L 13/161 |
| | | 285/286.2 X |
| 7,530,604 B2 | 5/2009 | Kerin et al. |
| 7,686,352 B2 | 3/2010 | Preston |
| 7,784,837 B2 | 8/2010 | Williams et al. |
| 7,823,289 B2 | 11/2010 | Willers et al. |
| 7,954,861 B2* | 6/2011 | Swift ............................ 285/382 |
| 8,123,143 B2 | 2/2012 | Willers et al. |
| 8,136,788 B2 | 3/2012 | Nilheim |
| 2003/0080564 A1* | 5/2003 | Izumi ................... F16L 13/163 |
| | | 285/382 |
| 2004/0150222 A1* | 8/2004 | Ichimura ............... F16L 41/082 |
| | | 285/382 X |
| 2005/0127044 A1 | 6/2005 | Nozue et al. |
| 2009/0256357 A1 | 10/2009 | Husberg |

* cited by examiner

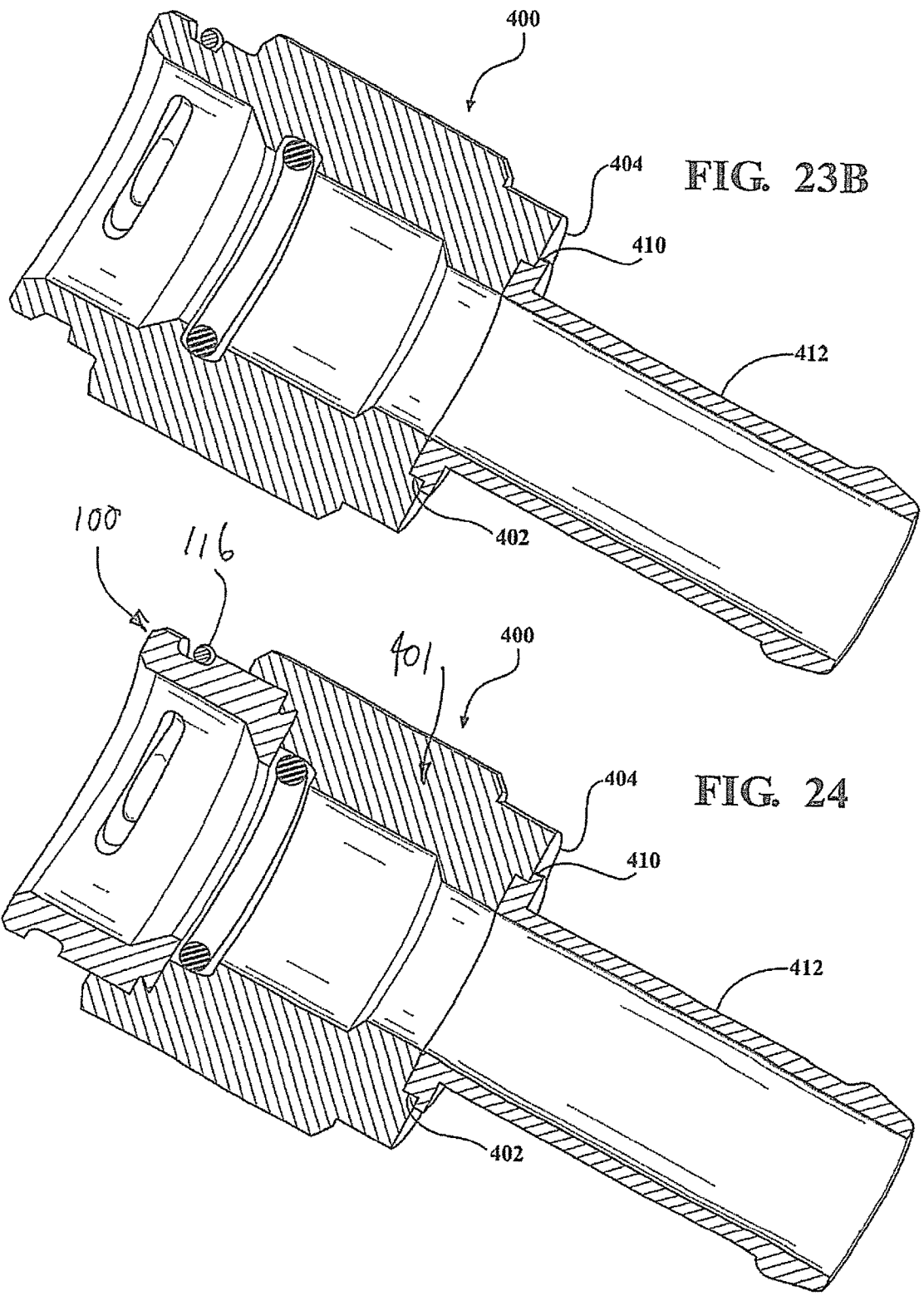

FLUID COUPLING WITH LOCK CONNECTION

CROSS-REFERENCE TO RELATED APPLICATIONS

This application claims priority benefit to the Nov. 27, 2013 filing date of U.S. Provisional patent application Ser. No. 61/909,474, for Quick Release Connector With Clinch Assembly, the contents of which are incorporated herein in its entirety.

BACKGROUND

The present disclosure relates, in general, to fluid couplings or connectors and, more particularly, to quick release fluid couplings or connectors.

Quick connectors are frequently employed for releasably attaching a tube or conduit to another component, such as thermal relief valve assembly, fluid filter, barb hose connector, etc. The quick connector includes a body with the through bore. External threads are formed on one end of the body for threadingly coupling the body of the quick connector to the other component. A seal, such as O-ring, is mounted in external recess on the body for sealingly coupling the body to an internal surface of a bore in the other component.

An internal recess in the body receives an internal seal, such as an O-ring, for sealingly coupling one end of the tube or conduit inserted into the body.

The tubular member comprises a conical or enlarged flanged portion spaced from the one end which seats within the transition zone of the bore. The body carries a retainer clip, either internally or, as shown in FIG. 1, externally. The body, which can be a quick connector shown in U.S. Pat. No. 5,909,901 and manufactured by Jiffy-tite Co., Inc., Lancaster, N.Y., includes a plurality of radially outward extending protrusions and spaced recesses. The recesses extend through slots formed in the body to snap behind a shoulder on the flanged portion on the tubular member to releasably lock the tubular member in the body. A seal band and an assurance cap may be provided to insure full seating of the tubular member within the body.

In assembling the tubular member to the body of the quick connector, the end of the tubular member is inserted the first end of the bore in the body. The conical surface of the transition zone on the tubular member forces the recesses of the retainer clip radially outward allowing the enlarged diameter conical portion to pass beyond the retainer clip into the bore 26. The resiliency of the retainer clip then allows the recesses of the retainer clip to snap behind the shoulder on the tubular member locking the tubular member in the body.

SUMMARY

A fluid coupling and a method of manufacturing a fluid coupling is disclosed.

A fluid coupling with a body including the bore receiving a tubular conductor, a retainer clip carried on the body for locking the tubular conduit to the body, a component with a bore extending from an open end, a seal mounted in the bore in the component position to sealingly couple to the tubular conduit extending through the body when the body is mounted in the component, and the body fixedly joined to the component by an interference joint between the body and the component.

The fluid coupling wherein the component comprises a surface engaged by the shoulder on the body.

In one aspect, the fluid coupling includes a component with a bore extending from an open end. The component is formed of a material capable of forced material displacement. A quick connector body comprises a through bore adapted to engage a tubular conduit inserted into the bore in the body when the body is disposed in the bore in the component. The body carries a recess for receiving material displaced from the component to non-threading fixedly couple the body to the component.

The material displaced from an internal surface in the bore in the component is disposed in the recess to mechanically lock the body to the component.

A stepped surface is formed in the bore in the component. A seal is mounted on the stepped surface for sealing engagement with the conduit inserted through the body when the body is fixedly attached to the component.

A retainer clip is carried on the body for releasable engagement with the tubular conduit to releasably lock the tubular conduit to the body.

In another aspect, semi-circular recesses are formed in the body and in an inner surface of the bore in the component. The semi-circular recesses are aligned to form a circular cross-section bore extending through adjoining surfaces of the body and the component when the body is seated in the component. A roll pin comprising a diameter larger than the circular bore is forcibly inserted into and through the bore. The roll pin initially is squeezed and then expands in the bore to form an interference fit with a constant spring force sealingly locking the body to the component together.

In another aspect, a surface of one of the component and the quick connector body forms a projection used in a projection welding process to form a semi-molten zone of material which, when solidified, sealingly locks the body to the component.

A method of manufacturing a fluid coupling is also disclosed. The method includes a fluid coupling comprising a component with the bore extending from an open end adapted to receive a body comprising a through bore engagable with the tubular conduit inserted into the bore in the body when the body is disposed in the component. The method includes forming the component or the body of a material capable of forced material displacement, forming a material receiving cavity in the body, or the component and displacing material from the component or the body into the cavity by a staking operation to fixedly couple the body to the component.

The step of displacing material further includes the step of displacing material using a staking tool comprising a plurality of axially extending fingers adapted to engage and displace material from the component into the recess in the body.

In another aspect, the method includes forming mating recesses formed in the component and the quick connector body. A roll pin is forcibly inserted through the aligned recesses, initially is squeezed and then expands in the aligned recess to form an interference fit mechanically locking the quick connector body to the component.

The present quick connector provides a number of advantages over prior quick connector designs. The novel quick connector eliminates the external threads along with the external O-ring used in prior art quick connectors. At the same time, the quick connector has a reduced cost due to less total mass, less length, enables more parts to be made from bar stock, eliminates the external O-ring, eliminates the need for threads and the typical hex bar stock used to form the quick connector which can be replaced with less expensive round stock thereby reducing scrap.

Furthermore, the novel quick connector comprises a lower profile, a reduced assembly time, improved cleanliness since fewer chips are generated, particularly due to the lack of formation of the threads, the elimination of the machining of the internal seal groove, and improved quality since there are no thread damage concerns.

BRIEF DESCRIPTION OF THE DRAWING

The various features, advantages and other uses of the present quick connector with lock connection will become more apparent by referring to the following detailed description and drawing in which:

FIG. 23B is a longitudinal cross-sectional view showing the assembled quick connector body and component of FIG. 23A;

FIG. 24 is a perspective view of another aspect of the fluid coupling;

DETAILED DESCRIPTION

Figure 1:
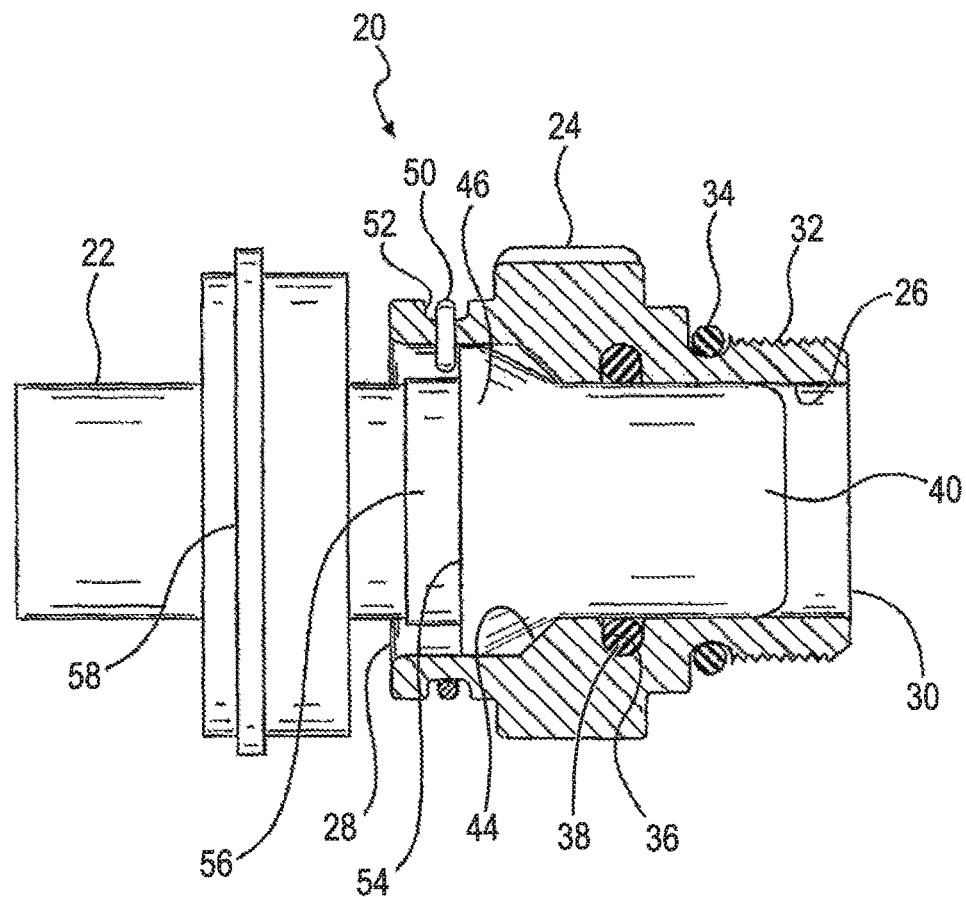
FIG. 1 is a longitudinal partially cross-sectioned view of prior art quick connector and fluid conduit.
Figure 2:
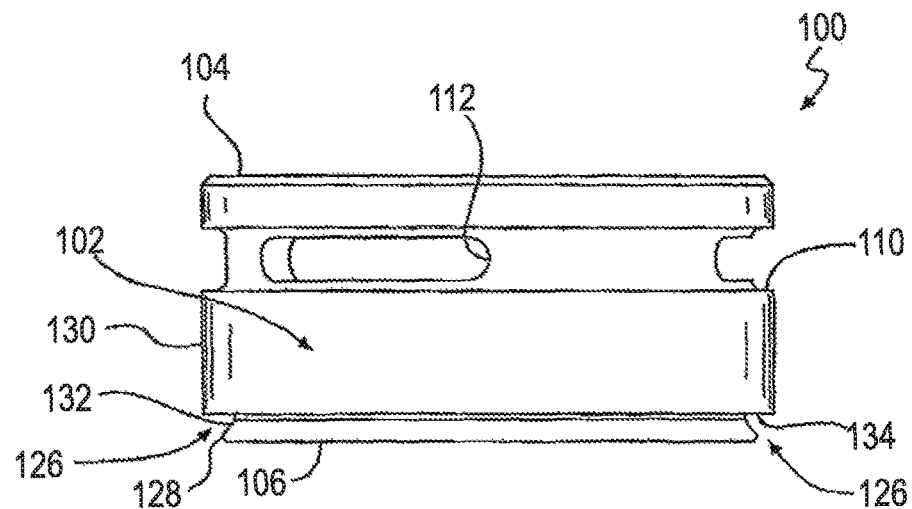
FIG. 2 is an enlarged front elevational view of a quick connector body of the present quick connector.

FIG. 1 depicts a prior art quick connector 20 for releasably attaching tubular member 22 in fluid flow communication with an external housing, not shown, such as a thermal relief valve assembly, etc.

Quick connector 20 includes quick connector body 24 with a through bore 26 extending from first end 28 to a second end 30. Quick connector body 24 comprises external threads 32 extending from the second end 30 for threadingly coupling quick connector body 24 to an external housing or component. Seal 34, such as an O-ring, is mounted in an external recess on quick connector body 24 generally adjacent to the end of threads 32 for sealingly coupling quick connector body 24 to an internal surface of a bore in the external housing.

Internal recess 36 receives an internal seal 38, such as an O-ring, for sealingly coupling end 40 of tubular member 22 to the internal surface forming bore 26 in quick connector body 24.

Bore 26 in quick connector body 24 is a stepped bore generally extending from a large diameter inlet end portion adjacent first end 28 of quick connector body 24 through conical surface 44 to a smaller diameter cross-section extending to second end 30.

Tubular member 22 comprises a conical or flange portion 46 spaced from end 40 which seats within conical surface 44 of bore 26. Either quick connector body 24 carries retainer clip 50, internally or, as shown in FIG. 1, externally in a retainer clip recessed groove. Quick connector body 24, which can be a quick connector shown in U.S. Pat. No. 5,909,901 and manufactured by Jiffy-tite Co., Inc., Lancaster, N.Y., includes a plurality of radially outward extending protrusions and spaced recesses. The recesses extend through slots 52 formed in quick connector body 24 to snap behind shoulder 54 on flange portion 46 on tubular member 22 to releasably lock tubular member 22 in quick connector body 24. A seal band 56 and an assurance cap 58 may be provided to insure full seating of tubular member 22 within quick connector body 24.

In assembling tubular member 22 to quick connector body 24 of quick connector 20, end 40 of tubular member 22 is inserted into first end 28 of bore 26 in quick connector body 24. Conical surface 44 on tubular member 22 forces the recesses of retainer clip 50 radially outward allowing flange portion 46 to pass beyond retainer clip 50 into bore 26. The resiliency of retainer clip 50 then allows the recesses of retainer clip 50 to snap behind shoulder 54 on tubular member 22 locking tubular member 22 in quick connector body 24.

Referring now to FIGS. 2-7, one aspect of novel quick connector 100 includes quick connector body 102 formed of suitably hard material, such as steel. Body 102 comprises first end 104, opposed second end 106, and through bore 108 extending from first end 104 to second end 106.

A retainer clip receiving groove in the form of an external annular recess or groove 110 is formed on body 102 spaced from first end 104. A plurality of apertures, generally in the form of slots 112 are formed in the inner end wall of groove 110 and open to bore 108. Slots 112 receive recesses 114 of retainer clip 116, such as a retainer clip shown in U.S. Pat. No. 5,909,901.

It will be understood that the provision of groove 110 and retainer clip 116 is described by way of example. Other forms of retaining a fluid conduit in body 102, such as an internal spring clip, etc., can also be employed.

Bore 108 can have a constant inner diameter extending first end 104 of body 102 to conical surface 120 spaced from second end 106. Conical surface 120 can have a conical shape extending from the constant diameter portion of bore 108 to a smaller diameter bore end 122 at second end 106 of body 102.

A material receiving cavity in the form of recess 126 is formed adjacent the second end 106 of body 102 for receiving deformable material from an external housing, as described hereafter. Recess 126 includes annular edge 128 at second end 106 of body 102 which is smaller in diameter than outer surface 130 of body 102. Recess 126 extends radially inward toward the longitudinal axis of body 102 in the form of conical surface 132, for example. Conical surface 132 transitions into planar wall 134. In cross-section, recess 126 defines a generally triangular shape as shown in FIGS. 2-7.

Quick connector 100 is non-removably attached to component 140, such as an external housing or member which, in one aspect, is formed of a softer material, such as 6160 aluminum, than body 102 of quick connector 100.

Component 140 can take a number of different forms, as described hereafter, but for purposes of this assembly description, comprises end portion 142.

End portion 142 of component 140 comprises open end 144 at first end 146 which opens to a stepped surface or bore formed of first bore portion 148, a radially inward extending first shoulder 150, a smaller diameter longitudinal second bore portion 152, second shoulder 154 which transitions to a reduced diameter third bore portion 156 which, in turn, transitions to third shoulder 158 terminating in an inner through bore portion 160.

Third shoulder 158 of the stepped surface forms a seat or shoulder for internal mounted seal 162. Seal 162 may in the form of the illustrated O-ring. Seal 162 forms a fluid seal between end 40 of tubular member 22 and quick connector 100.

It should be noted that the mounting of seal 162 on third shoulder 158 is visible from open end 144 of component 140 prior to insertion of the tube end. This provides a more positive visual inspection of the insertion and proper placement of seal 162 into component 140 as compared to the need for a special tool to check for the proper insertion of internal seal 38 in internal recess 36 in the prior art quick connector body 24 shown in FIG. 1 which is not visible to open first end 28 of quick connector body 24.

The inner diameter of first bore portion 148 is sized to slidably receive outer surface 130 of body 102. The inner diameter of second bore portion 152 is sized to slidably receive annular edge 128 of recess 126 on body 102.

Figure 3:
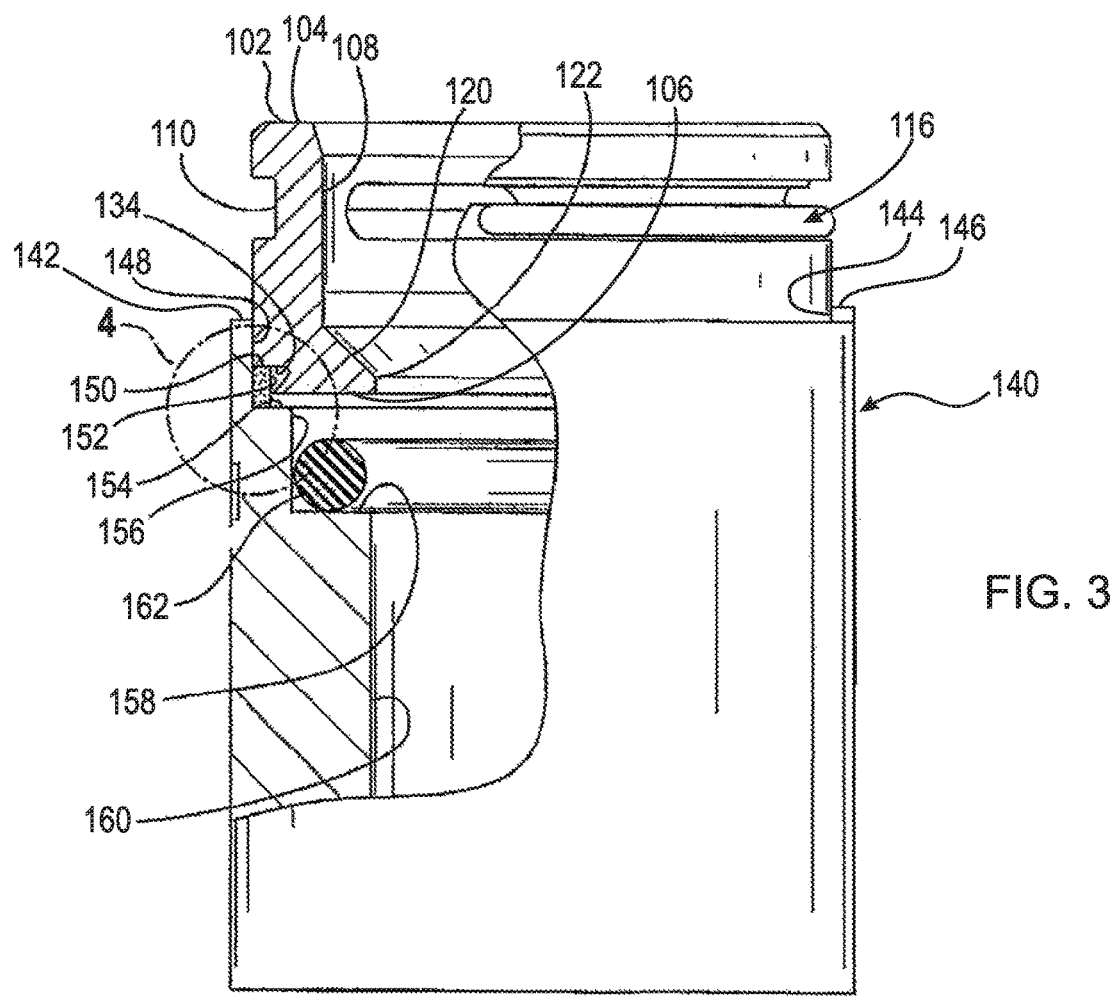
FIG. 3 is a partially cross-sectioned view showing the initial stage of a summary of a quick connector body to another component.
Figure 4:
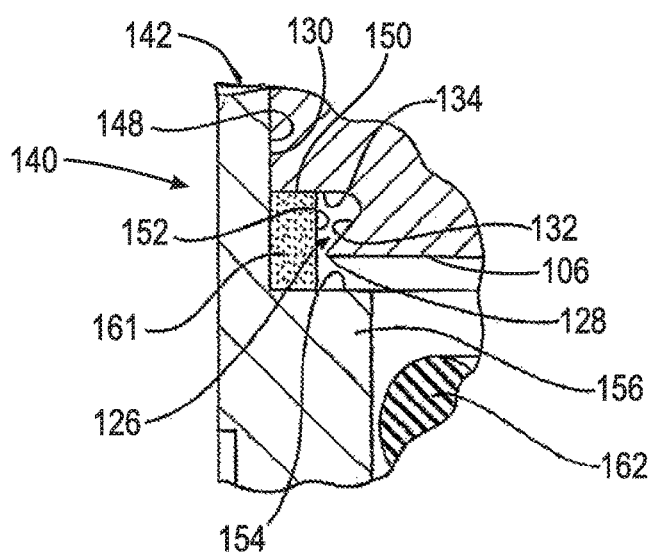
FIG. 4 is an enlarged sectional view taken in this circle four in FIG. 3.
Figure 5:
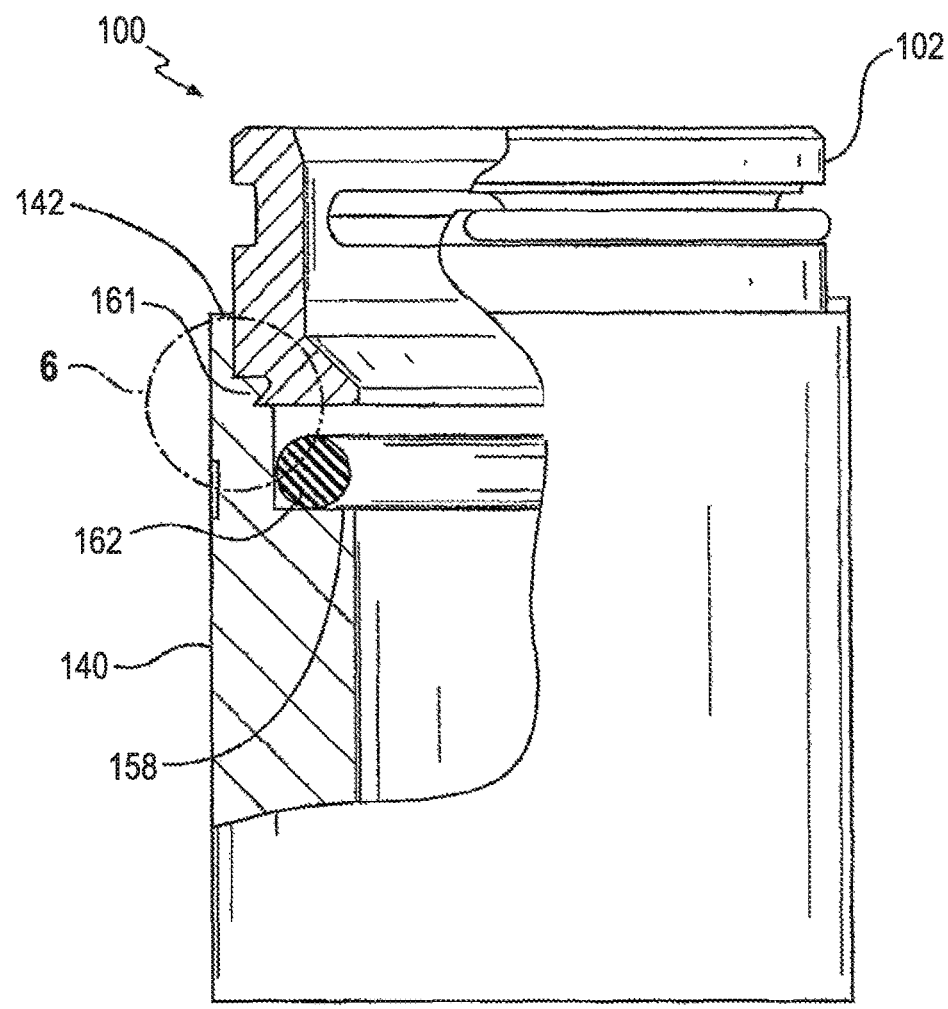
FIG. 5 is a longitudinal partially cross-sectioned view showing the complete assembly of the quick connector body in the component.
Figure 6:
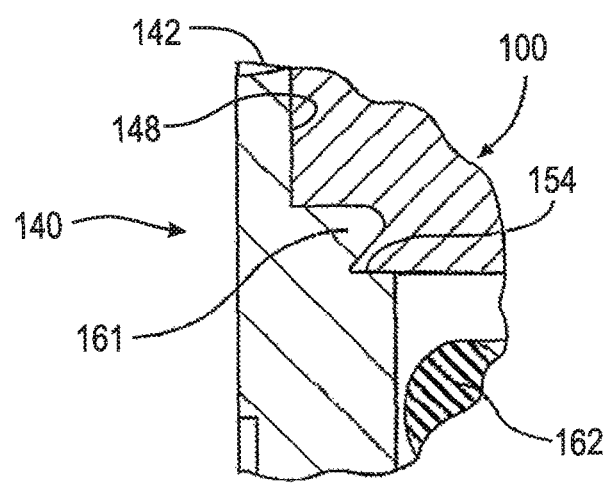
FIG. 6 is an enlarged cross-sectional view taken within the circle 6 in FIG. 5.
Figure 7:
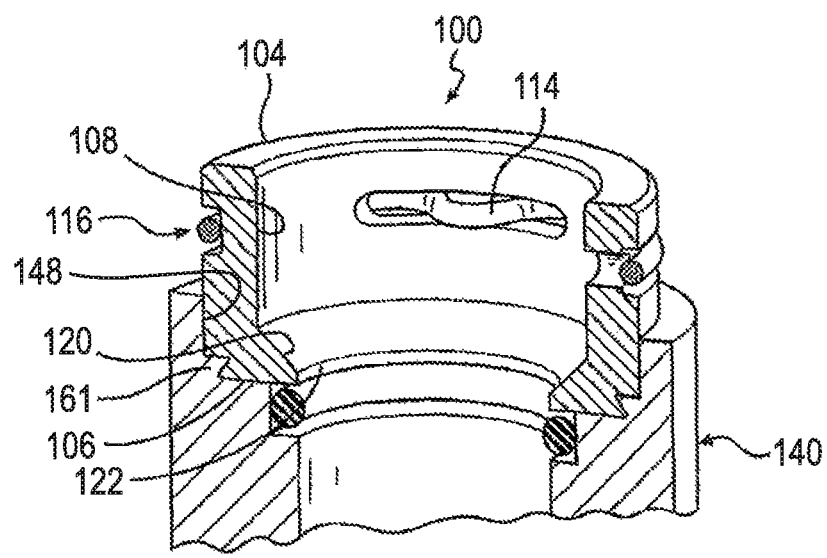
FIG. 7 is a partially cross-sectioned assembled view of the quick connector and component.

However, the longitudinal extent or distance between annular edge 128 of recess 126 and planar wall 134 of recess 126 is smaller than the longitudinal extent or length of second shoulder 154 as shown in FIG. 3. During insertion of body 102 through open end 144 on first end 146 of component 140, the surface of planar wall 134 of body 102 will engage to first shoulder 150 in component 140. However, at this time, annular edge 128 of quick connector 100 is still spaced from second shoulder 154 in component 140. Continued forced insertion of body 102 into component 140, combined with forming body 102 of a harder material than the material used to form component 140, will cause displaced material portion 161 of the material of component 140 which is capable of forced material displacement to be forcibly deformed and displaced or extruded into recess 126 on body 102 as shown in FIGS. 4-6 until second end 106 of body 102 seats against the second radially inward third bore portion 156 in component 140. The displaced material portion 161 is confined within the interior surfaces of recess 126 in body 102 to form a clinch connection which firmly and non-removably mechanically attaches body 102 to component 140 by an interference joint formed of solid inseparable material.

At the same time, displaced material portion 161 confined within recess 126 of body 102 of quick connector 100 provides a high pull out force resistance to separation of quick connector 100 from end portion 142.

Figure 8:
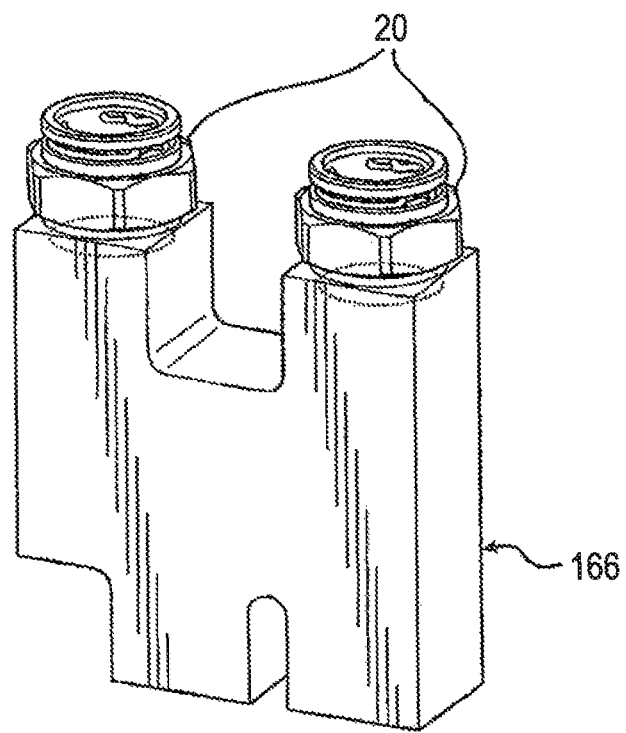
FIG. 8 is a perspective view of a prior art thermal relief valve (TRV) assembly using threaded quick connectors.

The clinch assembly of body 102 to component 140 can be applied in a number of different applications. FIG. 8 depicts prior art thermal relief valve assembly 166 which uses prior art quick connector 20, shown in FIG. 1, which are threadingly coupled to threaded internal bores at the inlet and outlet ports of thermal relief valve assembly 166. It should be noted that thermal relief valve assembly 166 may be provided with three or four ports and quick connector 20 may be applied on some or all of the inlet and outlet ports of thermal relief valve assembly 166.

Figure 9:
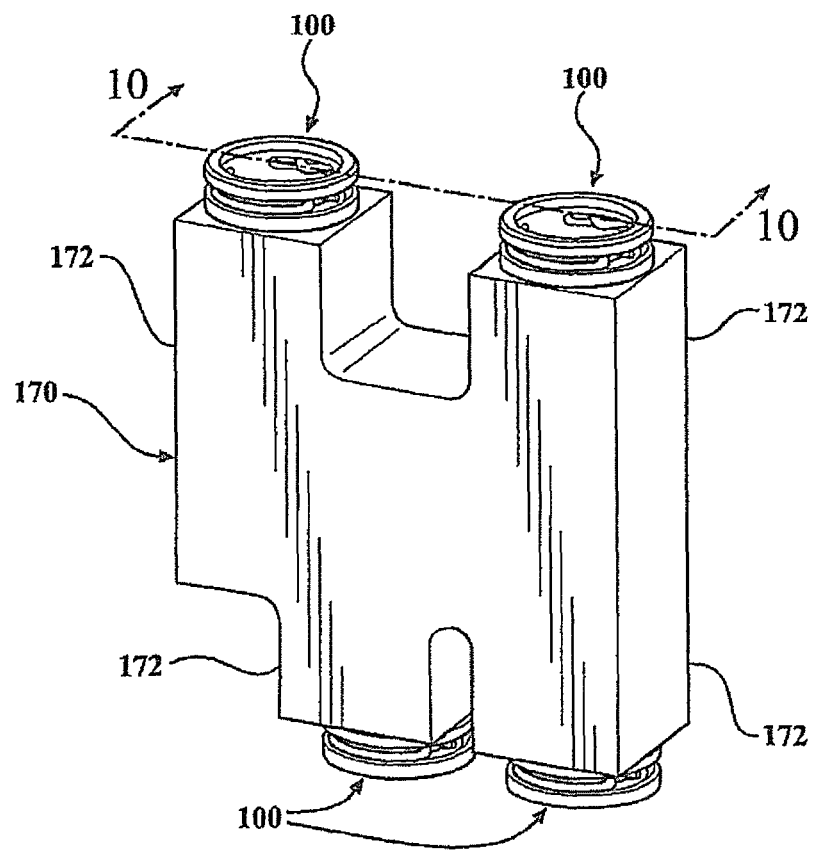
FIG. 9 is a perspective view of a thermal relief valve (TRV) assembly comprising the novel quick connectors with lock connections.
Figure 10:
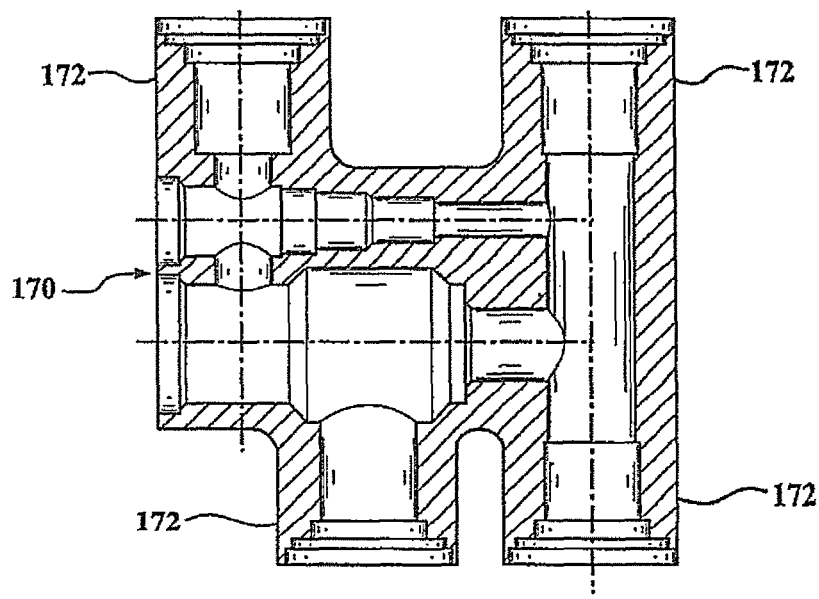
FIG. 10 is a lateral cross-sectional view of the thermal relief valve (TRV) assembly shown in FIG. 9.

FIGS. 9 and 10 depict thermal relief valve assembly 170, similar to thermal relief valve assembly 166, but comprising one or more quick connectors 100 constructed as described above mechanically clinched within the external end portions of the housing of thermal relief valve assembly 170. As shown in FIG. 10, end portions 172 define inlet and outlet ports of the thermal relief valve assembly 170. The stepped bore shown in FIG. 3 and described above is formed in one or more of external end portions 172 of thermal relief valve assembly 170 to mechanically clinch body 102 to the housing of thermal relief valve assembly 170.

Figure 11A:
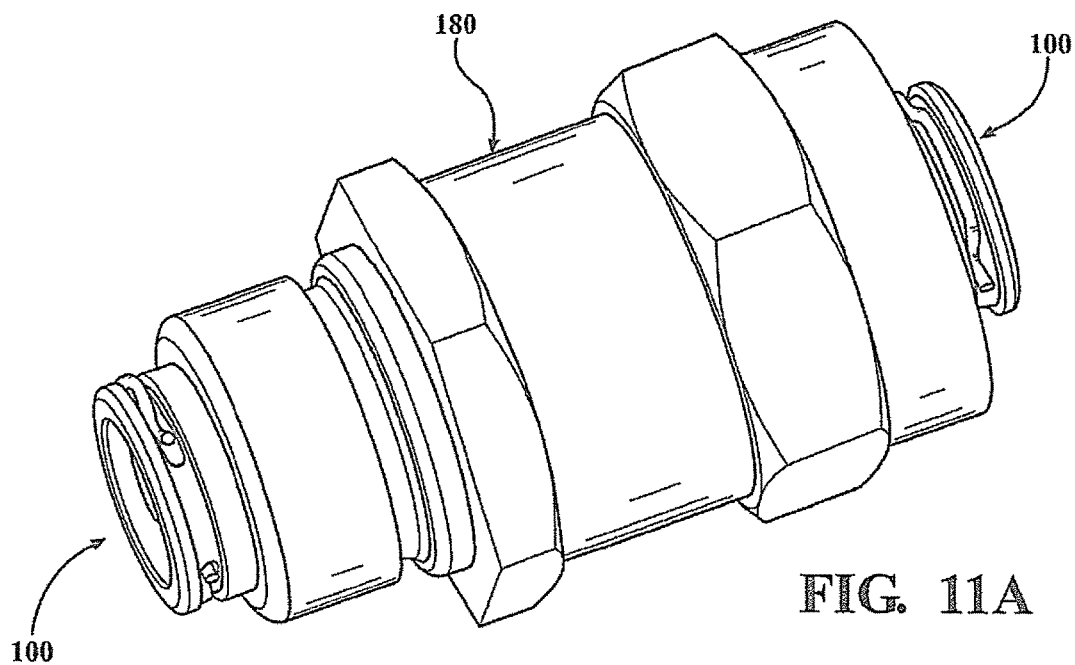
FIGS. 11A and 11B are perspective in longitudinal cross-sectional views, respectively, of the quick connector body component with a component is an inline filter.
Figure 11B:
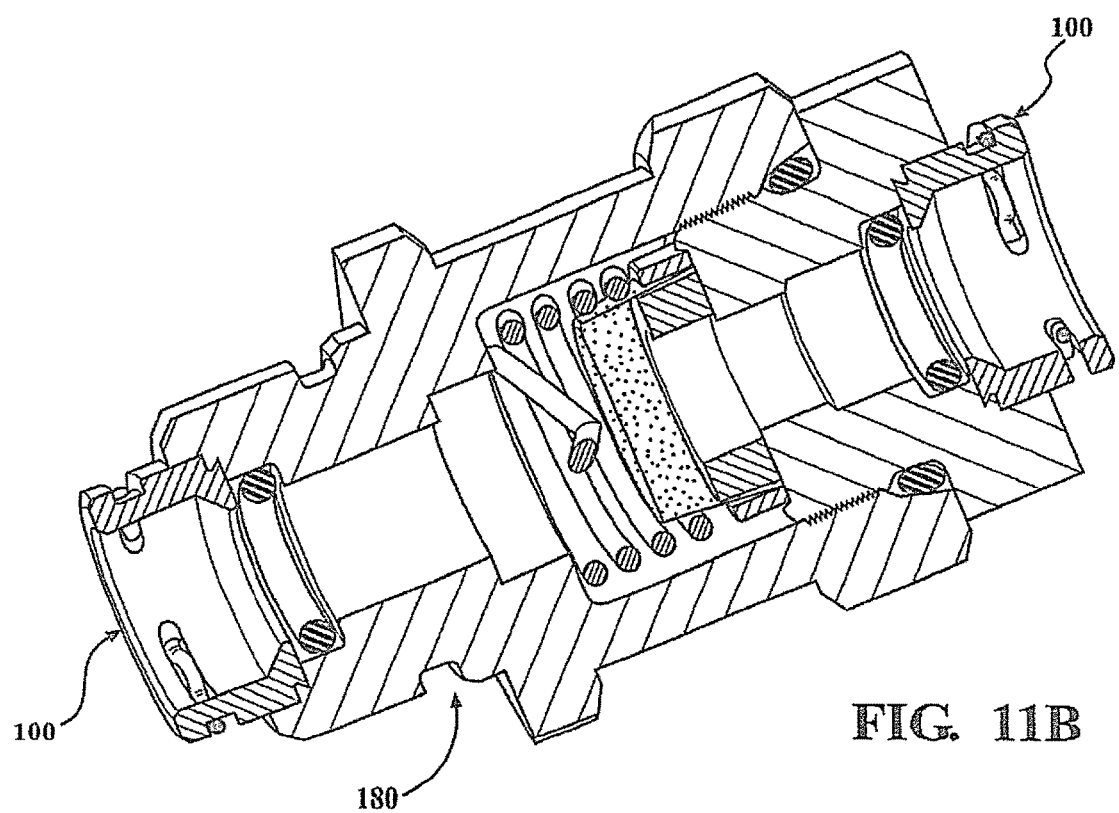

Other applications of the quick connector clinch assembly described above are shown in FIGS. 11A and 11B where inline filter 180 is depicted. Quick connector 100 may be mounted on one or both of the aligned ends of the through bore extending through the body of in-line filter 180, with the end portions of the bore extending through in-line filter 180 comprising the stepped configuration described above and shown in FIG. 3. Quick connector 100 is clinched in a non-removable fashion in the stepped bores on the ends of in-line filter 180 to form a unitary one-piece construction.

Figure 12A:
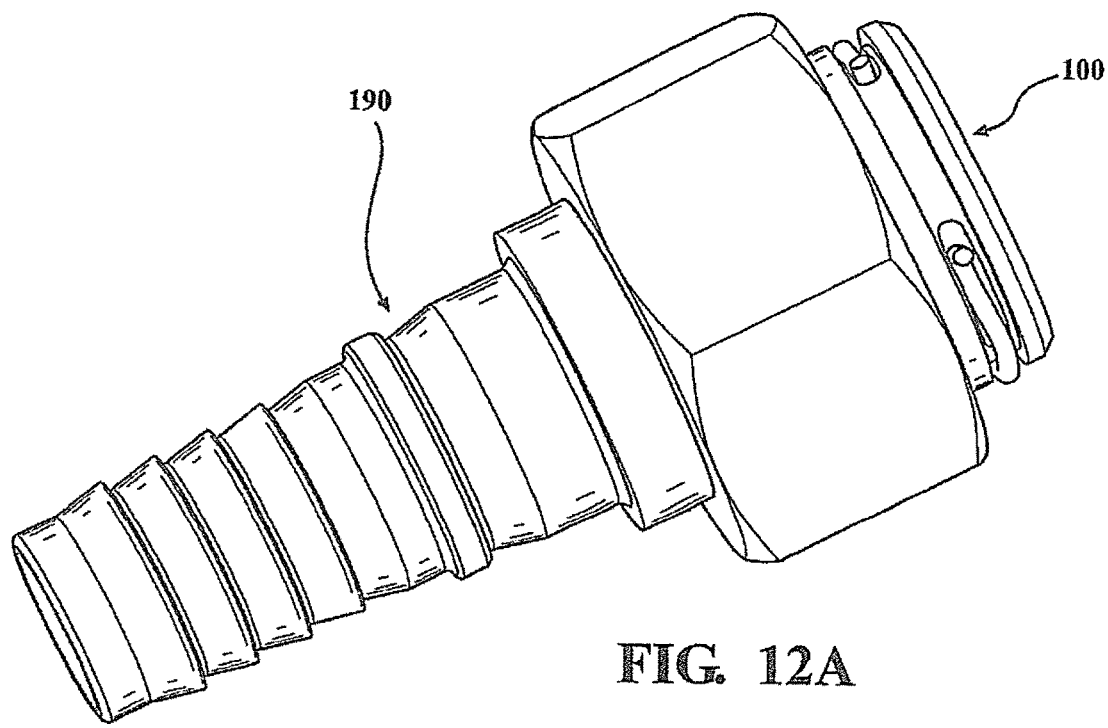
FIGS. 12A and 12B are perspective views and longitudinal cross-sectional views showing the quick connector body mounted in hose barb.
Figure 12B:
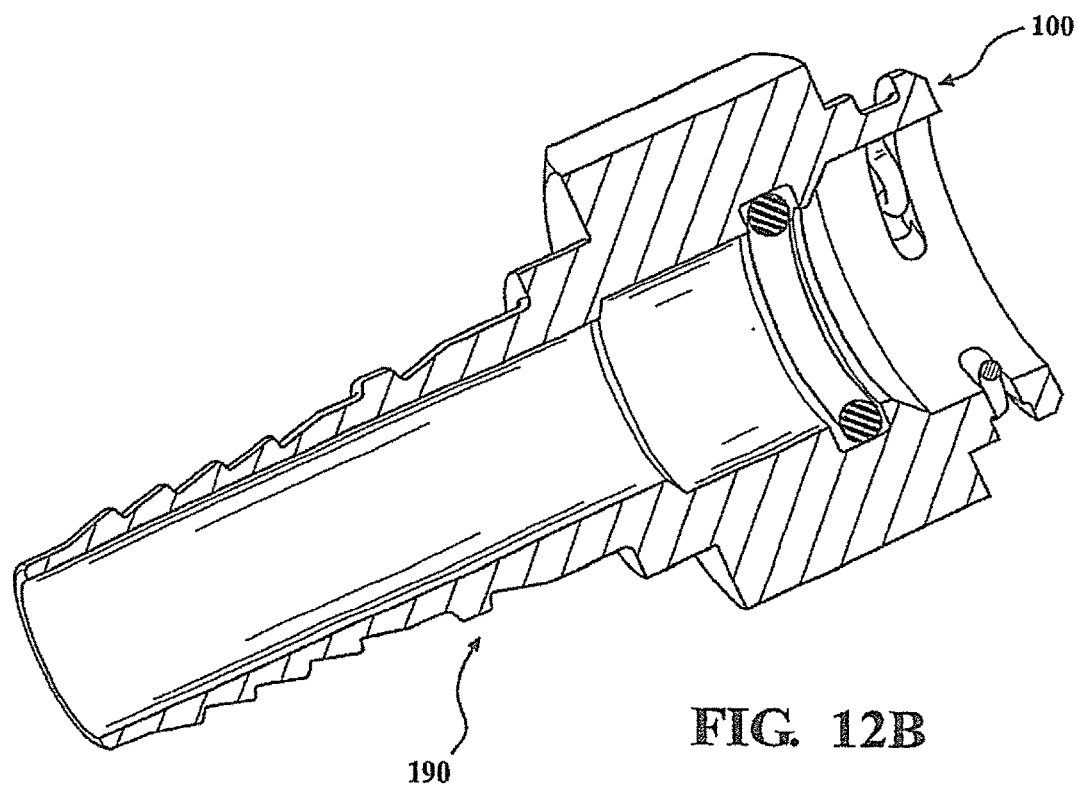

Similarly, as shown in FIGS. 12A and 12B, the clinched attachment of quick connector 100 in a stepped bore at the end of a hose barb 190 can be provided.

Figure 13A:
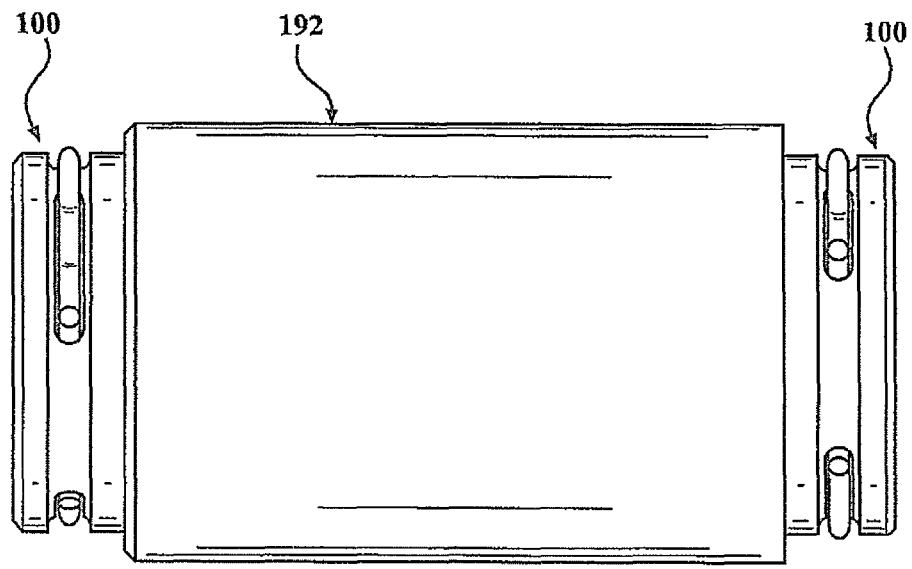
FIGS. 13A and 13B are side elevational and longitudinal cross-sectional views of two quick connectors mounted on opposite ends of an inline fluid coupling.
Figure 13B:
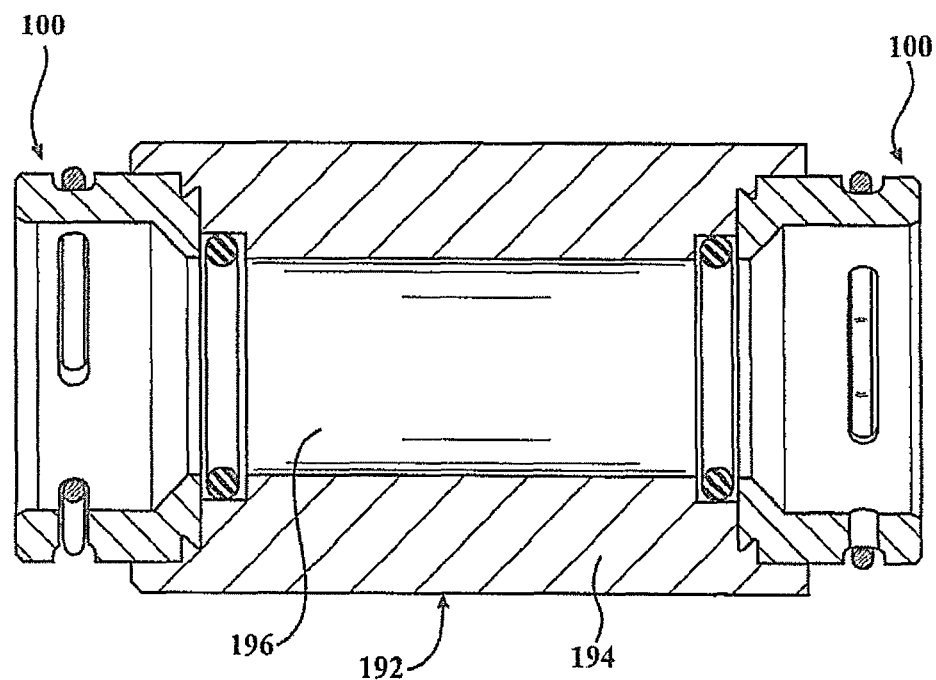

In FIGS. 13A and 13B simple inline hose or conduit connector 192 is shown as comprising a generally cylindrical body 194 with opposed open ends extending between a through bore 196 may receive quick connector 100 in a non-removable clinch attachment in stepped bore at the ends of through bore 196 to form a unitary tubular conduit or hose connection to connector 192.

Figure 14:
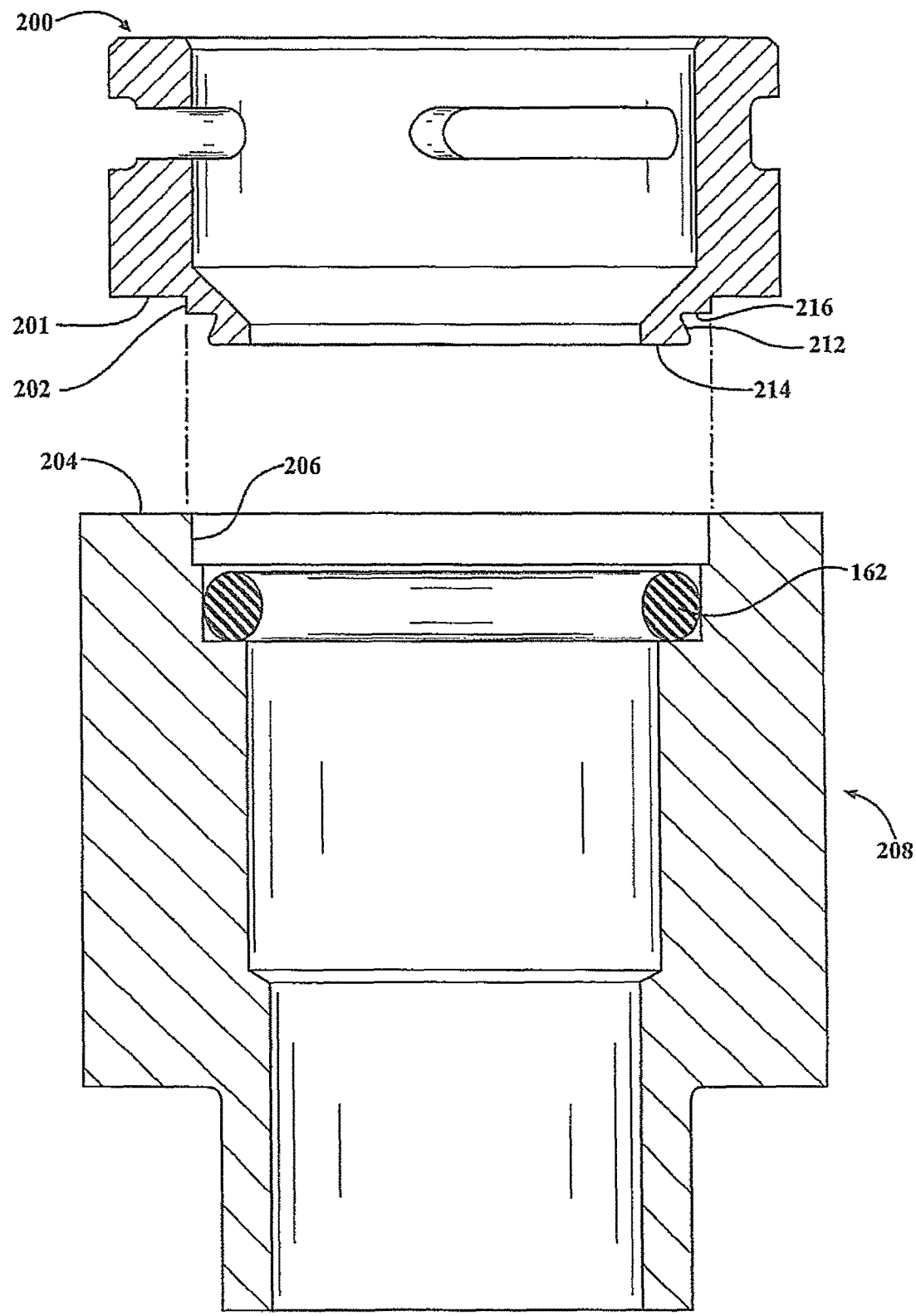
FIG. 14 is an exploded cross-sectional view showing modified quick connector body and component lock connector shown in a preassembled position.
Figure 15:
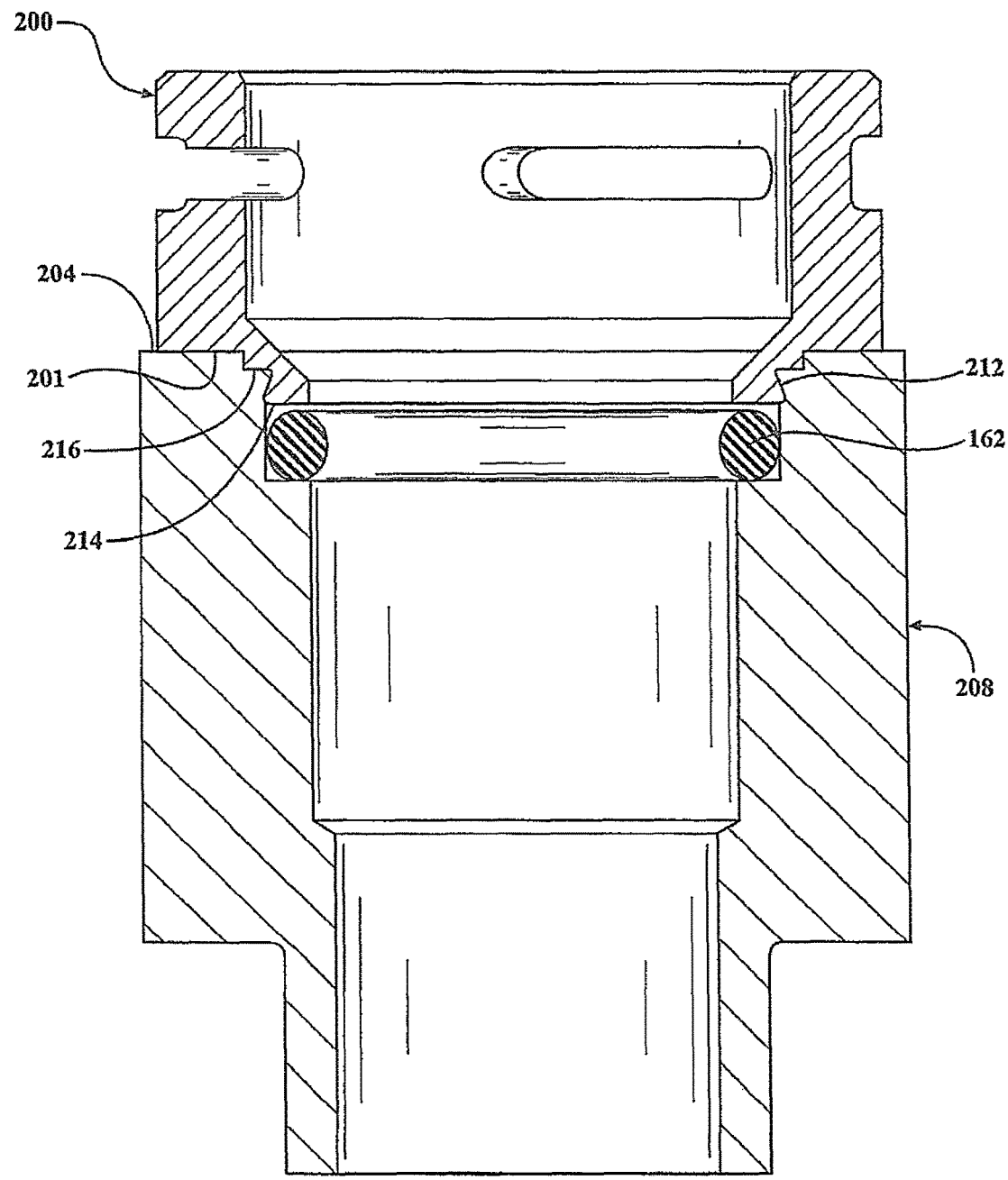
FIG. 15 is a cross-sectional view, similar to FIG. 14, but showing the quick connector body in a locked connection with the component.

Referring now to FIGS. 14 and 15, there is depicted a modification to the quick connector shown in FIGS. 1-13B. In this aspect, quick connector body 200 is similar to quick connector 100 with the modification of a radially inward extending surface, such as shoulder 201 formed adjacent to the second end (214?) of body 200 of quick connector 100. Shoulder 201 and adjacent axially extending annular surface 202 are configured for engaging mating end surface 204 and bore portion 206 in external housing 208. A radially inward extending material receiving cavity in the form of recess 212 extends between second end 214 of body 102 which includes radially inward extending surface 216 angularly disposed with respect to axially extending inner surface 202.

As shown in FIG. 15, when body 102 and external housing 208 are forcibly urged together, material is deformed from external housing 208 adjacent mating end surface 204 into locking engagement in recess 212 to non-removably lock body 102 to external housing 208.

FIGS. 1-15 illustrate a clinch joining of a quick connector body to an external housing. FIG. 16-20 depicts a staked joining of a quick connector body to an external housing.

Figure 16:
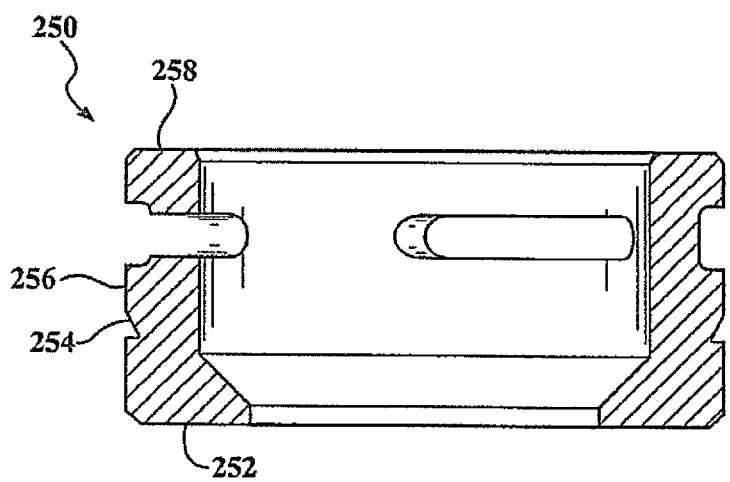
FIG. 16 is an enlarged front elevational view modified quick connector body.

Quick connector body 250, shown in FIG. 16, is similar to body 102 except that the second end portion 252 of body 250 defines a generally planar surface. A radially inward extending material receiving cavity, such as circumferentially arranged recess 254 is formed in outer wall 256 of body 250 intermediate second end portion 252 and opposed first end 258 of body 250.

Figure 17:
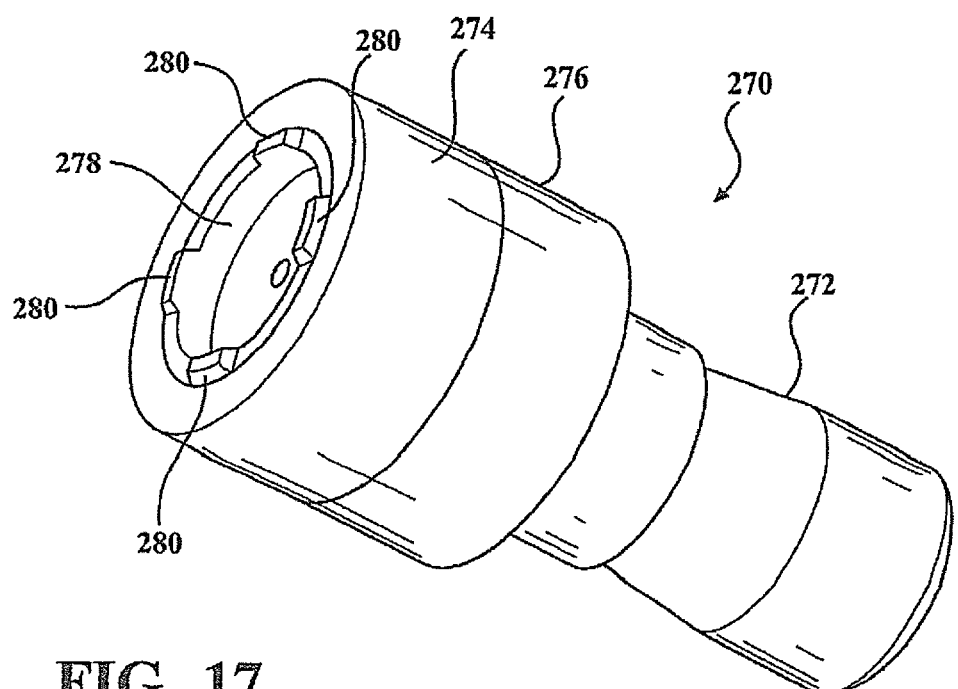
FIG. 17 is a perspective view of one aspect of staking tool used where the lock connection between the quick connector body and the component is a staked lock connection.

Body 250 is configured for staking to an external housing via staking tool 270 shown by example in FIG. 17. Staking tool 270 includes elongated shaft 272 which can be mounted to a force generating member, such as a hydraulic air cylinder, not shown. Rigid annular collar 274 seats against enlarged cylindrical portion 276 integrally formed at one end of shaft 272. Reduced diameter cylindrical wall 278 extends axially from cylindrical portion 276 and terminates in a plurality of force applying projections or fingers 280, with four equally circumferentially spaced fingers 280 shown by example only in FIG. 17.

Figure 18:
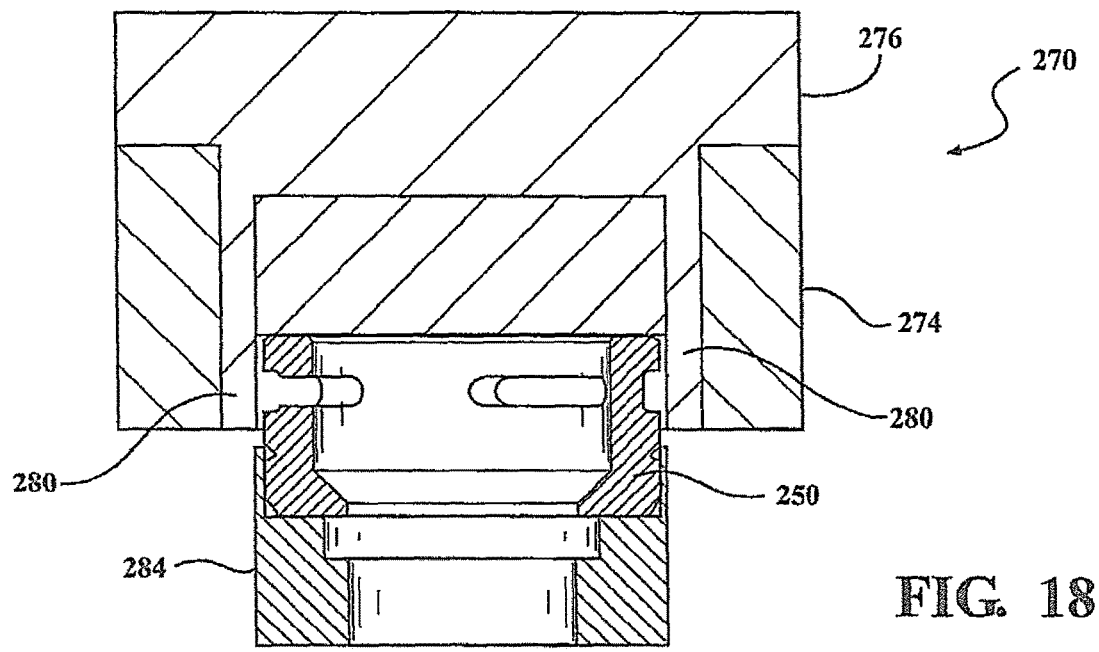
FIG. 18 is a cross-sectional view showing the staking tool of FIG. 17 staking the quick connector body of FIG. 16 to an external component.

In FIG. 18, for a polygonal or square external housing, fingers 280 are disposed to engage the enlarged area corner portions of external housing 284. FIG. 18 depicts a lateral cross-section view of the engagement of staking tool 270 with body 250 mounted in external housing 284 which is fixedly disposed and axially aligned with staking tool 270.

Figure 19:
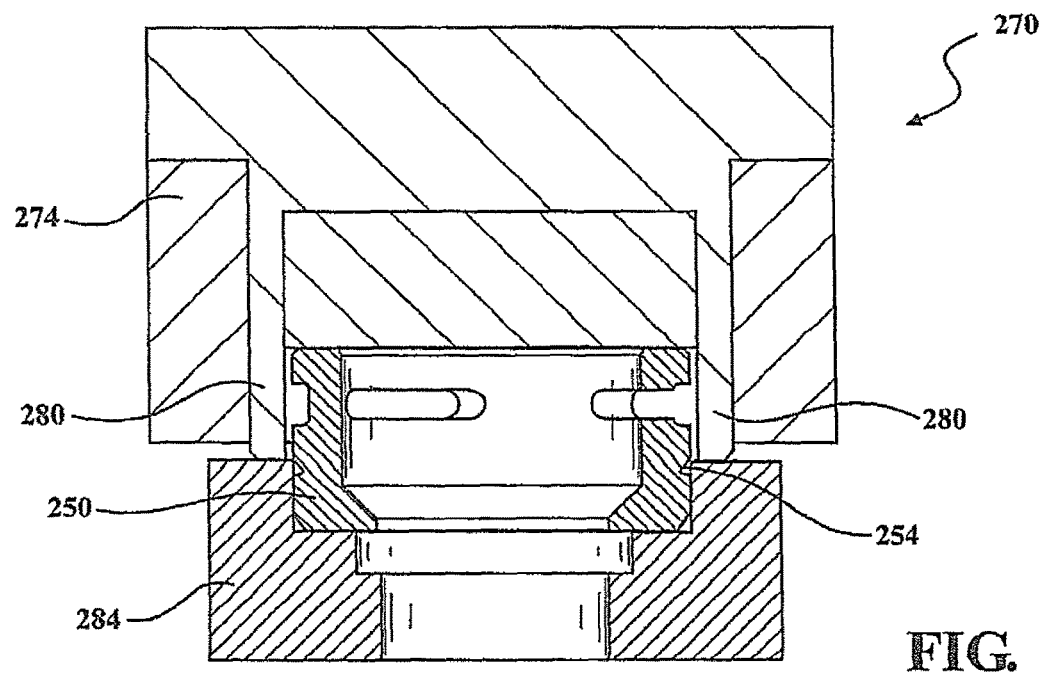
FIGS. 19 and 20 are cross-sectional view showing stages of the staking operation used to lock the quick connector body of FIG. 16 to the component.
Figure 20:
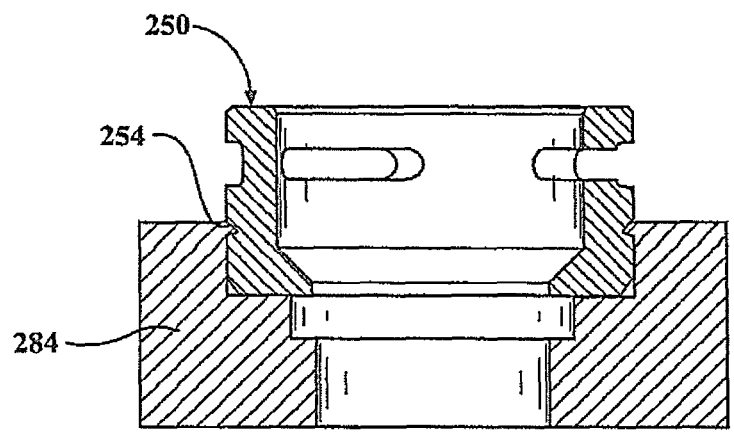

As staking tool 270 is moved into engagement with the corners of external housing 284, as shown more clearly in FIG. 19, which is a cross-sectional view taken between two diametrically opposed corners of external housing 284, fingers 280 deform the end of external housing 284 and displace material into recess 254 in body 250 thereby locking body 250 to external housing 284 as shown in FIG. 20.

Although not shown, the tubular end surface of external housing 284 can have a circular cross-section. In this configuration, fingers 280 of staking tool 270 could form a continuous annular finger to displace material into recess 254 in the quick connector body or around the entire 360° of recess 254.

Referring now to FIGS. 21A-21E, there is depicted a quick connector body 300 which is similar to previously described quick connector bodies. Body 300 includes enlarged second end 302 with a flat circumferential upper surface 304.

Figure 21A:
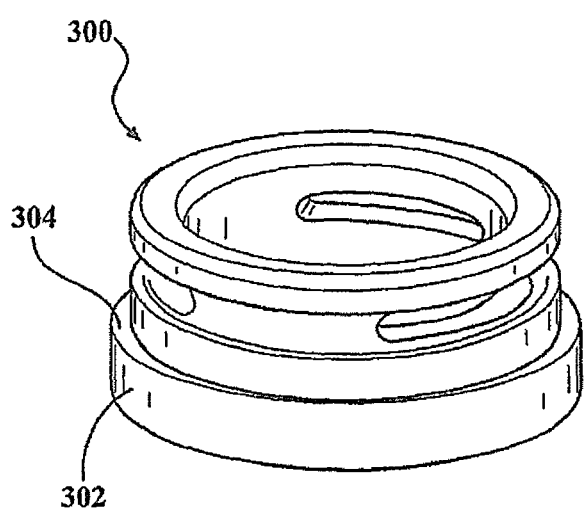
FIG. 21A is a perspective view of a modified quick connector body.
Figure 21B:
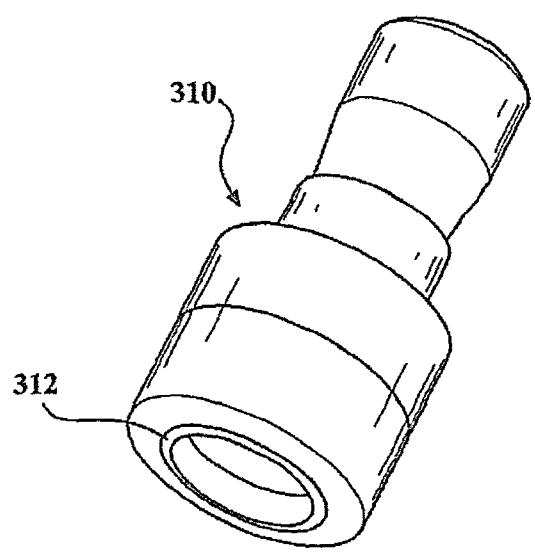
FIG. 21B is a perspective view of a modified staking tool, similar to the staking tool depicted in FIG. 17.
Figure 21C:
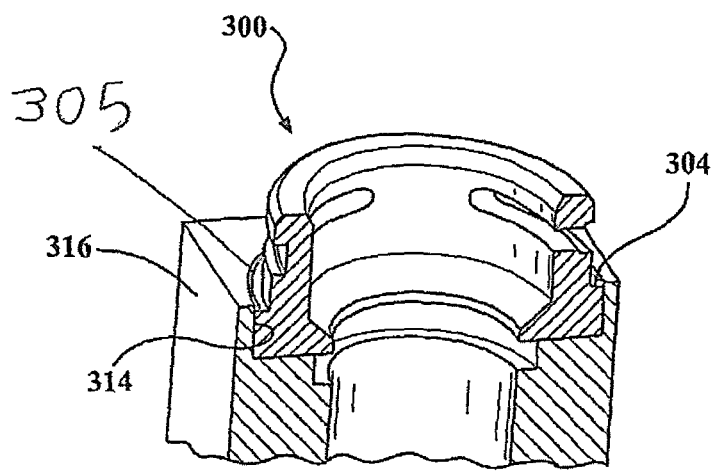
FIG. 21C is a cross-sectional view showing the staked lock connection of the quick connector body of FIG. 21A in a component by use of the staking tool shown in FIG. 21B.
Figure 21D:
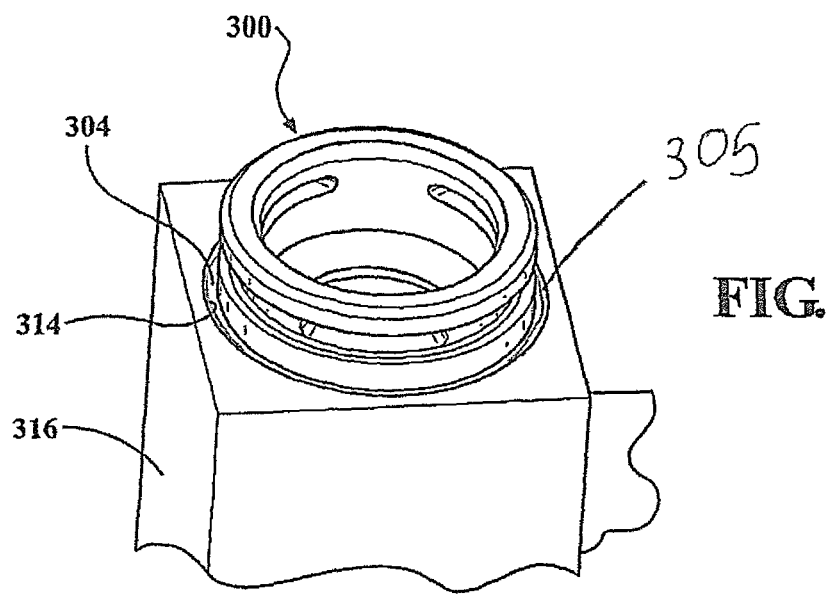
FIG. 21D is a perspective view of the quick connector body and component shown in FIG. 21C.
Figure 21E:
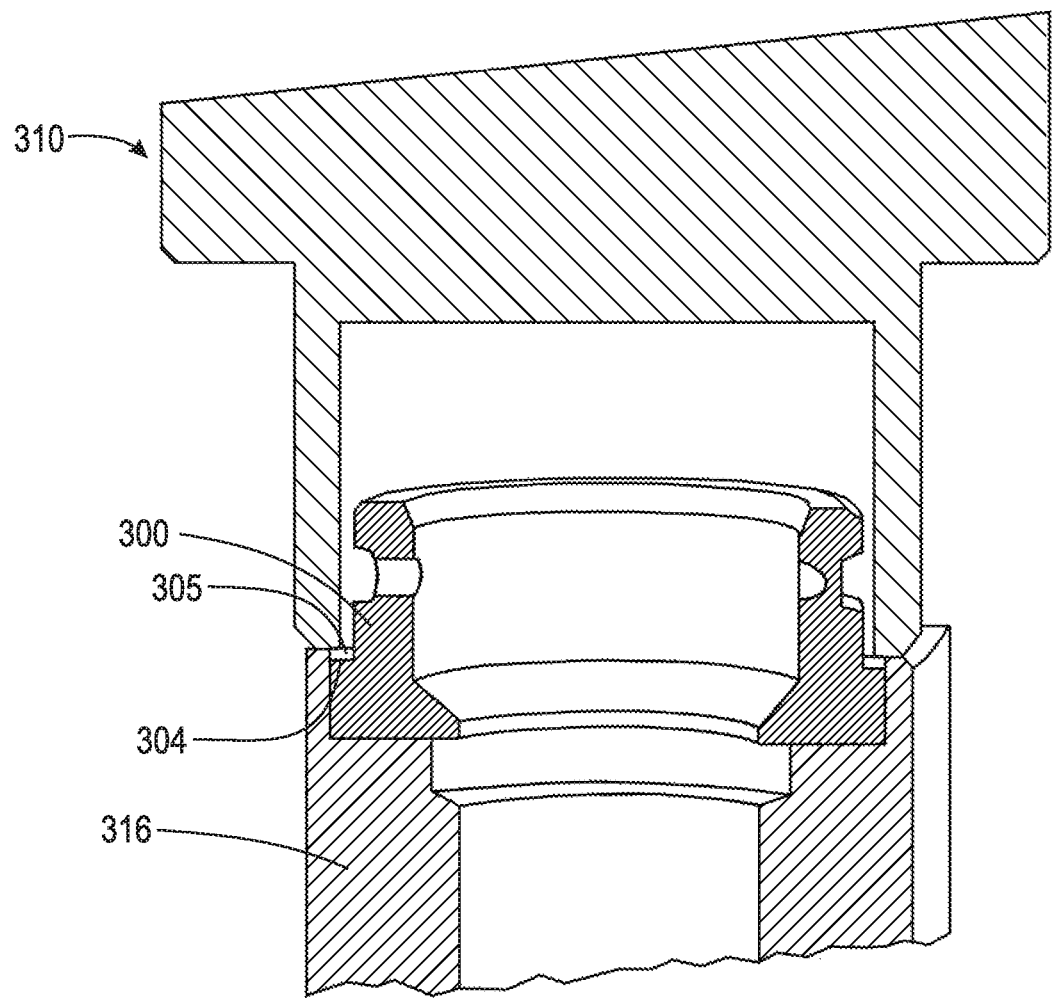
FIG. 21E is an enlarged, cross-sectional view showing the staking operation using the body and component shown in FIGS. 21A-21D.

Body 300 is adapted for use with staking tool 310 shown in FIG. 21B. Staking tool 310 is similar to the previously described staking tool except that staking tool 310 includes continuous circumferential metal ring 312. The diameter of ring 312 is sized to engage the upper surface of component 316, when body 300 is mounted in stepped bore 314 of component 316. The remainder of staking tool 310 centers body 300 on component 316. Staking tool 310 supplies force causing deformation of the metal of end of component 316 causing displacement 305 of the deformed material into fixed mechanical engagement over adjacent upper surface 304 of body 300. This creates an interference joint joining body 300 and one end of component 316 as shown in FIGS. 21C, 21D, and 21E.

Figure 22A:
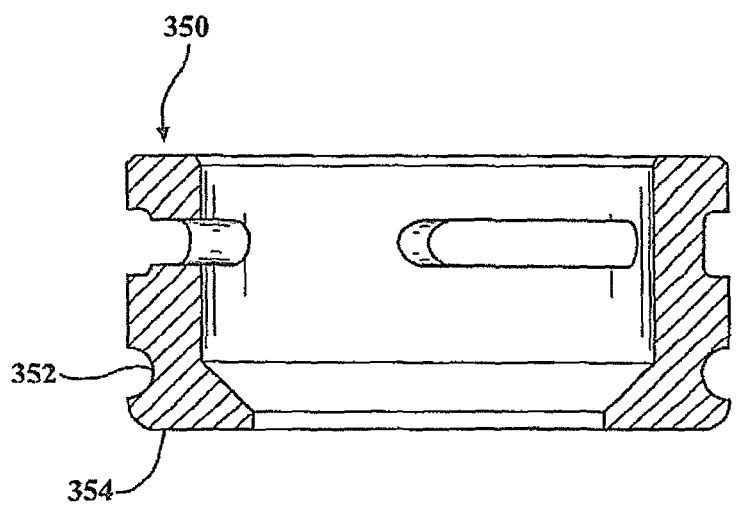
FIG. 22A is an enlarged cross-sectional view of another aspect of a quick connector body.
Figure 22B:
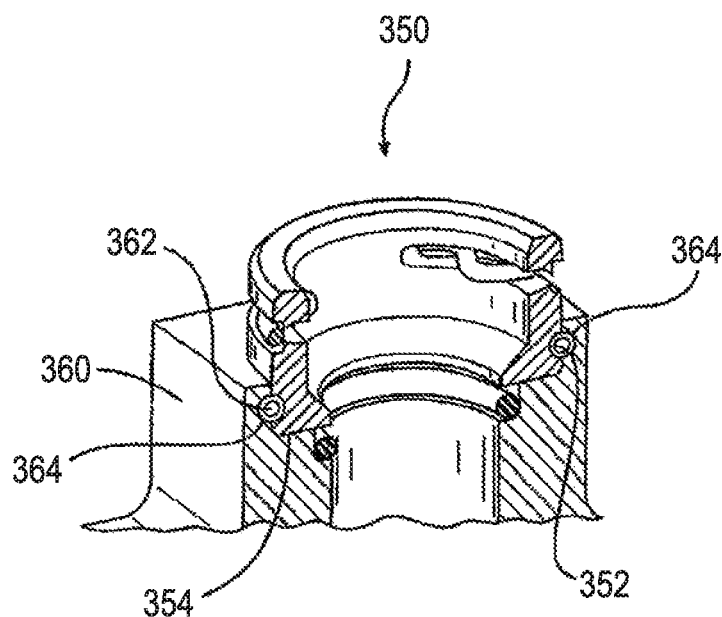
FIG. 22B is a cross-sectioned view showing the locked connection of the quick connector body depicted in FIG. 22A to a component using roll pins.
Figure 22C:
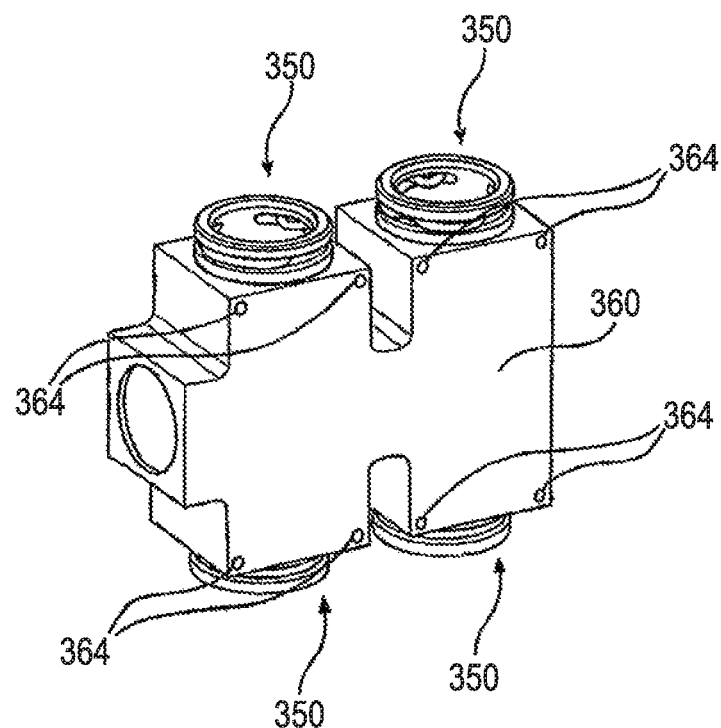
FIG. 22C is a perspective of a thermal relief valve (TRV) assembly comprising a plurality of quick connector body shown in FIG. 22A locked to the thermal relief valve (TRV) assembly by roll pins as shown in FIG. 22B.

Another modification of the quick connector body with a mechanical lock connection to a component is shown in FIGS. 22A-22C. In this aspect, quick connector body 350, similar to the previously described quick connector bodies, comprises a radially inward extending semi-circular recess 352 spaced from second end 354. Recess 352 is shown by example as being in the form of a semi-circle.

Body 350 is adapted for sliding insertion into the open end of a stepped bore formed in one end of component 360.

Component 360 carrying the open ended bore comprises one or a pair of parallel aligned semi-circular recesses 362 positioned to align with recess 352 of body 350 when body 350 is inserted into the stepped end of the bore in component 360 as shown in FIG. 22B. Aligned recesses 352 and 362 form a circular bore.

Roll pin 364 in the form of an elongated cylindrical member with an outer diameter slightly larger than the inner diameter of the circular shaped bore formed by aligned recesses 352 and 362. Roll pin 364 is then forcibly inserted into the opening formed by aligned recesses 352 and 362 from either side of component 360. Roll pin 364 is initially squeezed and then expands in the bore to form an interference fit with a constant spring force to lock body 350 in component 360.

Figure 23A:
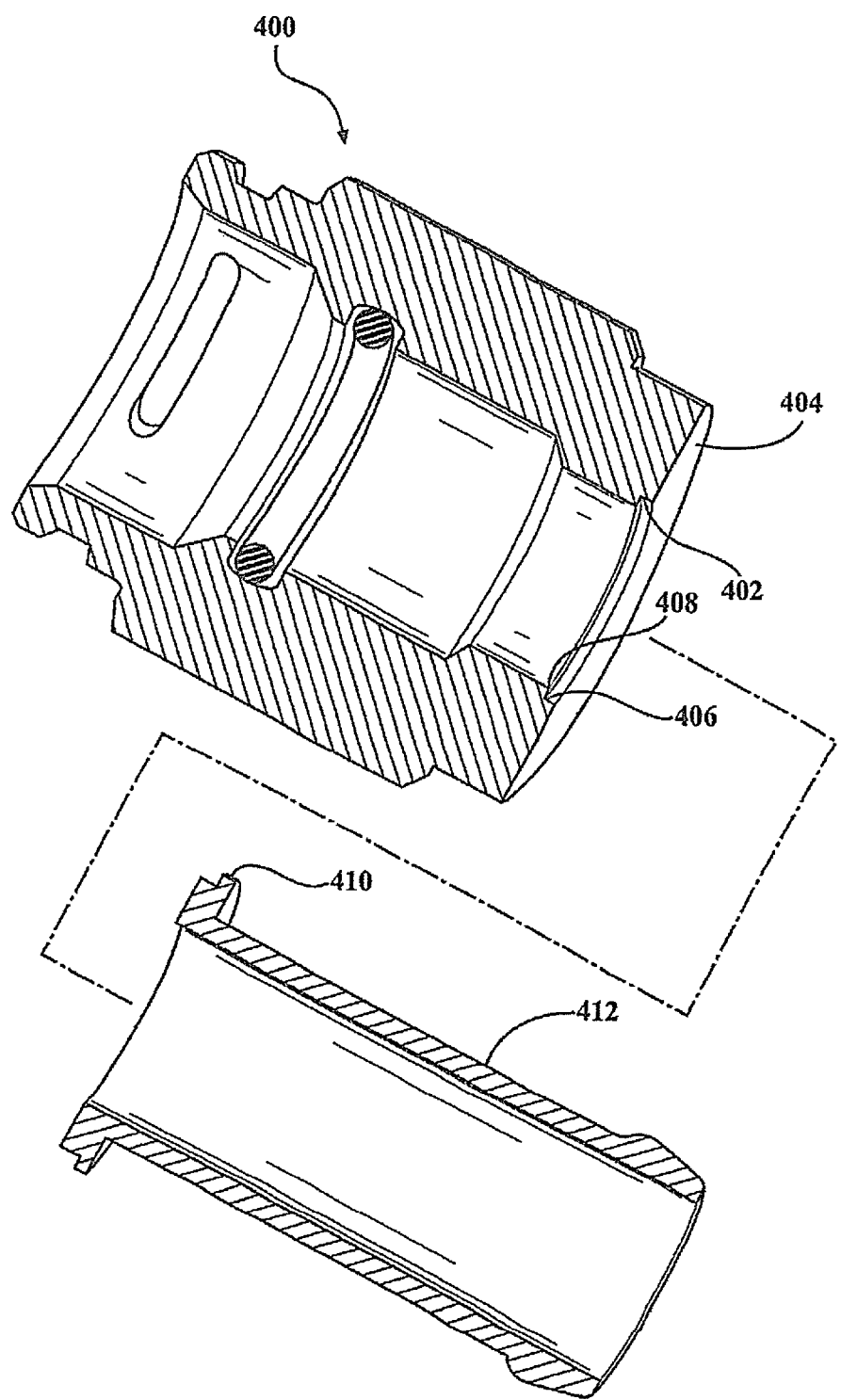
FIG. 23A is an exploded perspective, partially cross-section view to an another aspect of a quick connector body with a lock connector to a component.

FIGS. 23A-23C depicts a quick connector body connection formed by a projection welding process. Quick connector body 400, similar to quick connector 20 shown in FIG. 1 or any of the quick connector bodies shown in the other figures, comprises stepped shaped recess 402 formed at end 404. Stepped recess 402 forms longitudinally extending circumferential wall 406 and radially extending wall 408. Wall 406 comprises an inner diameter slightly smaller than the outer diameter of end 410 of hose barb 412.

In order to join body 400 to hose barb 412, body 400 and hose barb 412 are brought into engagement with end 410 seating against wall 406 at end 404 of body 400. Welding current is supplied to one of body 400 or hose barb 412. This turns a portion of the material forming wall 406 at the mating surfaces into a semi-molten state allowing body 400 to seat fully in stepped recess 402 as shown in FIG. 23B. When allowed to cool and solidify, hose barb 412 is sealingly and fixedly connected to body 400.

Referring now to FIGS. 25A-25D there is depicted another aspect of a fluid coupling. Several of the previously described aspects of the fluid coupling utilize material displacement from the mating component into a material receiving cavity or a recess in the quick connector body to create an interference joint fixedly coupling the quick connector body to the mating component.

The opposite movement of displaced material from the quick connector body into a material receiving cavity or recess in the mating component can be accomplished.

In this aspect, quick connector body 450, is to be coupled to component 452. Since the displaced material comes from body 450, body 450 is formed of a softer material than the material used to form component 452.

Figure 25A:
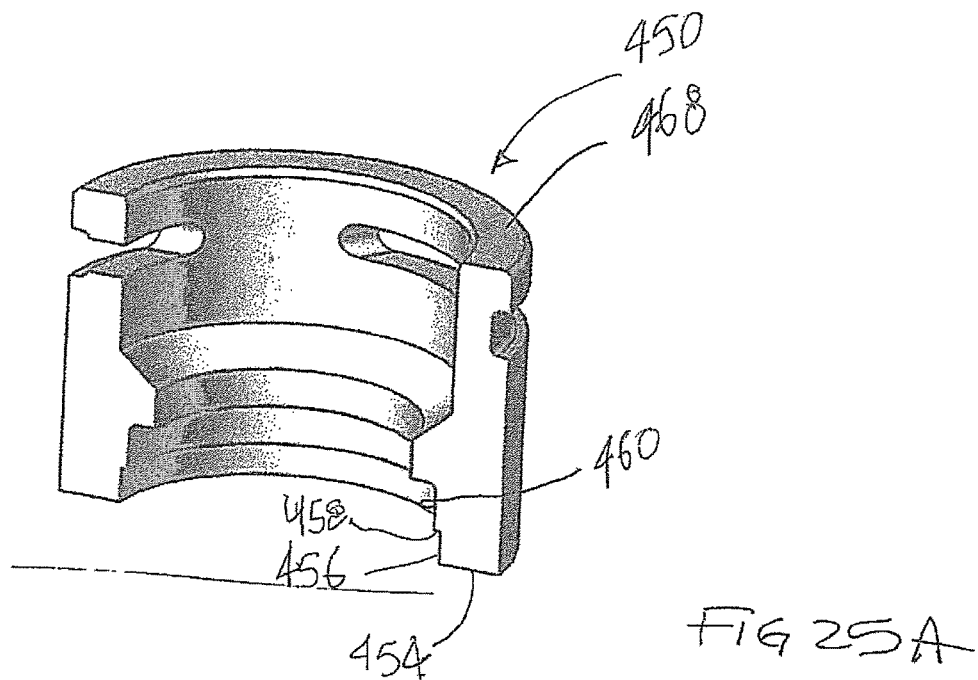
FIG. 25A is a longitudinal cross-section showing another aspect of a quick connector body.
Figure 25B:
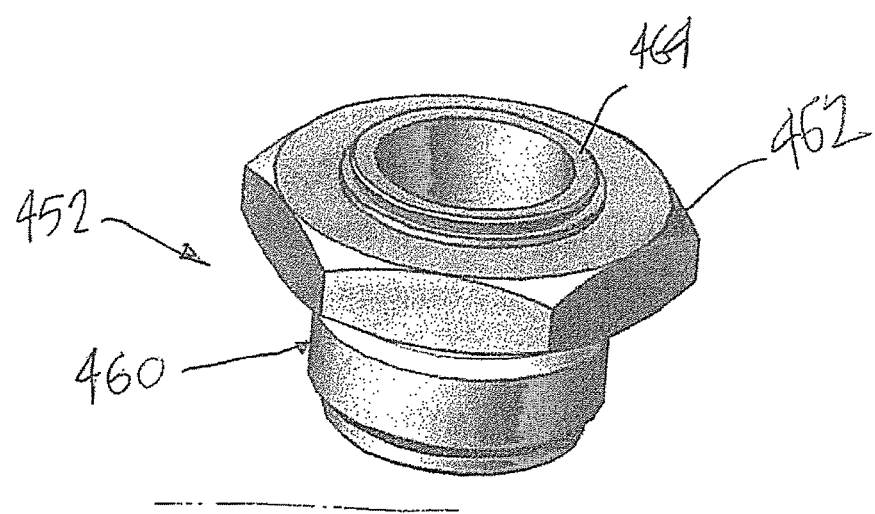
FIG. 25B is an enlarged perspective view of another aspect of a coupling end for a mating component to the quick connect body shown in FIG. 25A.
Figure 25C:
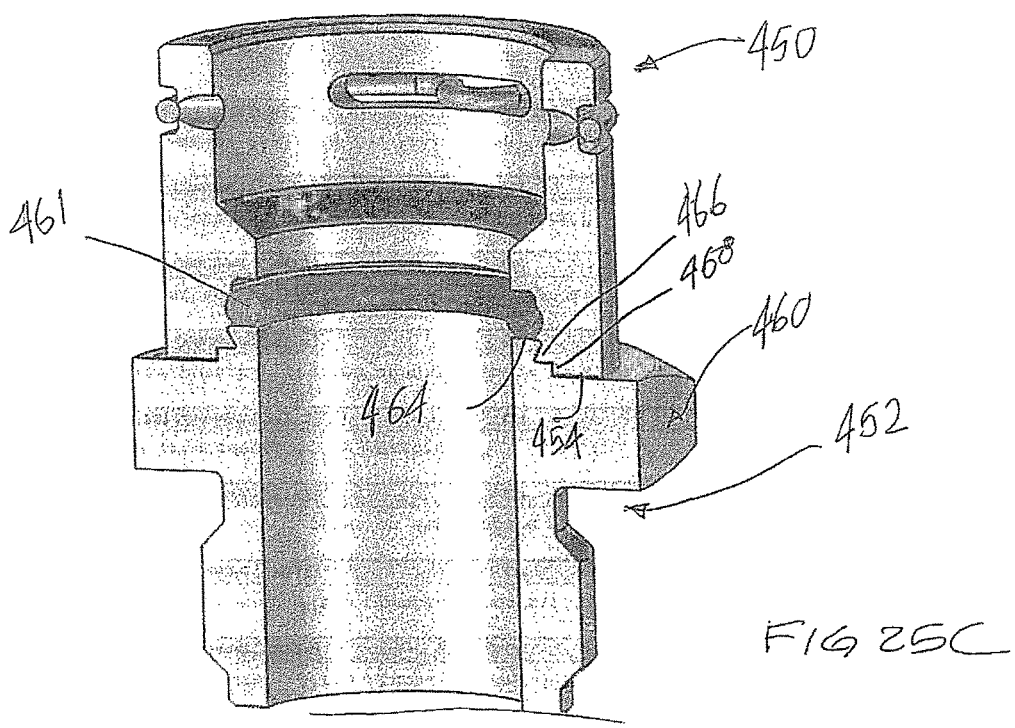
FIG. 25C is a longitudinal cross-sectional assembled view of the quick connect body and the coupling end of the mating components shown in FIGS. 25A and 25B; and, FIG. 25D is an enlarged perspective view showing the interference displaced material joint between the quick connector body and the coupling end shown in FIG. 25C.
Figure 25D:
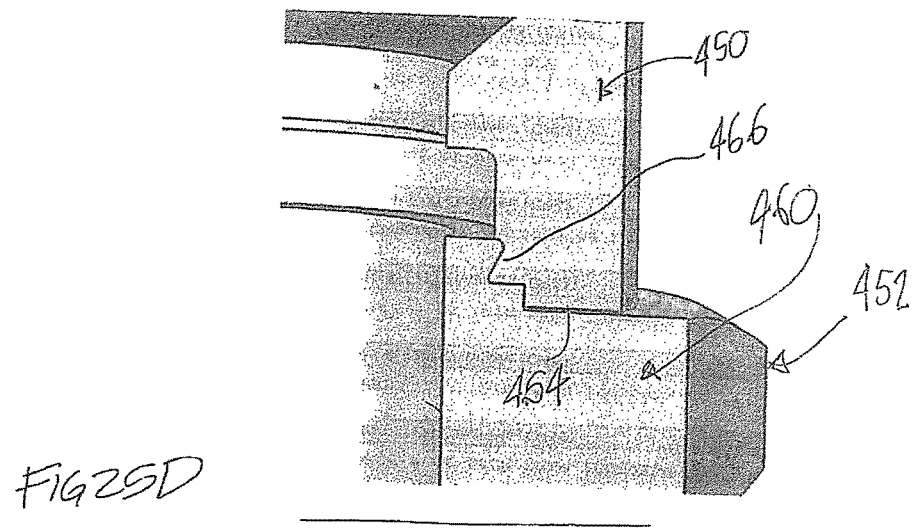

As shown in FIGS. 25B, 25C, and 25D, body 450 includes bottom end 454 surrounding the through bore through body 450. First wall 456, shoulder 458 and second wall 459 extend from bottom end 454 internally within body 450.

Component 452, shown in FIGS. 25B-25D is depicted as an end coupling which can be integrally formed on or fixedly joined to the remainder of the mating component, which, as described above, by example, can be a thermal relief valve assembly, an in-line filter, a fluid coupling, etc.

End coupling 460 of component 452 includes flange 462, which may be formed with hex flats spaced from first end 464. A radially inward extending material receiving cavity, shown in the form of a recess 466 by example, is formed spaced from first end 464. The recess 466 transitions into annular surface 468 and then to flange 462.

When body 450 is seated or mounted on first end 464 of end coupling 460 of component 452, bottom end 454 of body 450 seats on flange 462. Pressure is applied to annular surface 468 of body 450 causing displacement of shoulder 458 and second wall 459 of body 450 into recess 466 of end coupling 460 of component 452. The displaced material in recess 466 forms an interference joint fixedly and sealingly joining body 450 to component 452.

The pressure applied to the quick connector body to displace material from a quick connector body into recess 466 in component 452, can be by a clinch operation or by use of one of the staking tools shown above where the staking force tool or clinching force is applied to the upper end of the quick connector body.

Thus, there has been disclosed in different aspects described above a two-piece quick connector body and component which are sealingly and fixedly coupled in a locked connection. The locked connection reduces the cost of the quick connector assembly and construction due to the use of less material, less expensive round stock to form a quick connector body, the lack of machining external threads on the quick connector body and internal threads on the end of the bore in the component and the elimination of an internal O-ring shield and difficult to machine internal field mounting recess.

What is claimed is:

1. A fluid coupling, comprising:
  a body, including:
    a first end and a second end;
    an outer surface;
    a first bore arranged to receive a tubular member; and,
    a recess formed adjacent the second end, the recess having:
      an annular edge arranged at the second end;
      a radially outward facing conical surface extending radially inward from the annular edge; and,
      a planar wall extending radially outward from the conical surface to the outer surface;
  a component including a second bore extending from an open end; and,
  a seal mounted in the second bore to sealingly engage the tubular member extending through the body when the body is mounted in the component;
  wherein the body is fixedly joined to the component by an interference joint between the body and the component.

2. The fluid coupling of claim 1, wherein the interference joint is a non-threaded joint.

3. The fluid coupling of claim 1, wherein the component comprises one of a thermal relief valve assembly, an in-line filter, a hose barb, and an in-line fluid connector.

4. The fluid coupling of claim 1, wherein the recess is arranged to receive material displaced from the component to fixedly couple the body to the component.

5. The fluid coupling of claim 4, wherein the material displaced from an internal surface of the component is disposed in the recess to mechanically lock the body to the component.

6. The fluid coupling of claim 1, further comprising a stepped surface formed in the second bore, wherein the seal is mounted on the stepped surface.

7. The fluid coupling of claim 1, wherein:
  the body includes a radially extending shoulder spaced from the second end; and,
  the recess is disposed radially inward of an innermost edge of the shoulder and axially between the second end and the shoulder.

8. The fluid coupling of claim 7, wherein the shoulder is arranged to engage an end surface of the component.

9. The fluid coupling of claim 1, wherein the interference joint is a weld.

10. The fluid coupling of claim 1, wherein the interference joint comprises:
  aligned recesses formed in the body and the component, the aligned recesses forming a through-bore in the body and the component when the body is mounted in the open end of the component; and,
  a roll pin forcibly inserted through the through-bore formed by the aligned recesses forcibly joining material from the body and the component to form the interference joint.

11. The fluid coupling of claim 1, wherein the interference joint comprises a forced staked interference joint forcibly joining material from a portion of the body and the component.

12. The fluid coupling of claim 1, wherein material displaced from the second bore is disposed in the recess to mechanically lock the component to the body.

13. The fluid coupling of claim 1, wherein the second end is arranged facing the seal.

14. A method of manufacturing a fluid coupling, comprising:
  forming a body including an outer surface and a first bore arranged to receive a tubular member;
  forming a component including a second bore extending from an open end;

forming a recess on the outer surface and axially inward from and nonadjacent to a first and second end of the body, the recess having a conical surface and a planar wall;

mounting a seal in the second bore positioned to seal the component to the tubular member extending through the body when the body is mounted in the second bore;

fixedly joining the body to the component by an interference joint between the body and the component; and, displacing material from the component into the recess to form the interference joint.

15. The method of claim 14, wherein the step of displacing material further comprises:

forcibly engaging a staking tool with the component to displace material from the component into the recess.

16. The method of claim 14, wherein the step of fixedly joining the body to the component by an interference joint comprises:

securing the interference joint via a weld.

17. The method of claim 14, further comprising:

forming mating open ended apertures in the component and in the body;

mounting the body in the component to align apertures; and, forcibly inserting a roll pin through the aligned apertures and forming the interference joint mechanically locking the body to the component.

18. The method of claim 14, further comprising forming a material projection on one of the component and the body.

19. A fluid coupling, comprising:

a component, including a first bore extending from an open end, the first bore having:
  a first bore portion forming a first radially inward facing surface; and,
  a second bore portion forming a second radially inward facing surface, the second bore portion is:
    arranged parallel to and radially outward from the first bore portion;
    connected to the first bore portion via a shoulder; and,
    arranged axially between the first bore portion and the open end;

a body arranged to be secured in the second bore portion, including:
  a radially outward facing surface having a recess; and,
  a second bore arranged to receive a tubular member; and, a seal arranged in the first bore portion to sealingly engage the tubular member extending through the body when the body is secured in the component;

wherein as the body is inserted into the second bore portion, displaced material arranged on one of the radially outward facing surface and the second bore portion is collected in the recess.

* * * * *

UNITED STATES PATENT AND TRADEMARK OFFICE
CERTIFICATE OF CORRECTION

PATENT NO. : 10,221,976 B2
APPLICATION NO. : 14/555301
DATED : March 5, 2019
INVENTOR(S) : James Anthony Kujawski and Bradley Chester Fremont It is certified that error appears in the above-identified patent and that said Letters Patent is hereby corrected as shown below:

On the Title Page

Item (73), should read:
"(73) Assignee: Oetiker NY, Inc., Lancaster, NY (US)"

Signed and Sealed this
Thirteenth Day of December, 2022

Katherine Kelly Vidal
*Director of the United States Patent and Trademark Office*